(12) United States Patent
Loomis

(10) Patent No.: US 10,893,768 B2
(45) Date of Patent: Jan. 19, 2021

(54) POWER POLE FOR ARTIFICIAL TREE APPARATUS WITH AXIAL ELECTRICAL CONNECTORS

(71) Applicant: Belgravia Wood Limited, Road Town (VG)

(72) Inventor: Jason Loomis, Decatur, GA (US)

(73) Assignee: Belgravia Wood Limited, Road Town (VG)

( * ) Notice: Subject to any disclaimer, the term of this patent is extended or adjusted under 35 U.S.C. 154(b) by 0 days.

(21) Appl. No.: 16/679,740

(22) Filed: Nov. 11, 2019

(65) Prior Publication Data
US 2020/0146491 A1    May 14, 2020

Related U.S. Application Data

(63) Continuation of application No. 16/588,440, filed on Sep. 30, 2019, which is a continuation of application
(Continued)

(51) Int. Cl.
*A47G 33/06* (2006.01)
*F21V 23/06* (2006.01)
(Continued)

(52) U.S. Cl.
CPC ............. *A47G 33/06* (2013.01); *A41G 1/005* (2013.01); *A41G 1/007* (2013.01); *F21S 4/10* (2016.01);
(Continued)

(58) Field of Classification Search
CPC .................................................... A47G 33/06
See application file for complete search history.

(56) References Cited

U.S. PATENT DOCUMENTS

| 377,953 A | 2/1888 | Mills |
| 438,310 A | 10/1890 | Edison |
| (Continued) | | |

FOREIGN PATENT DOCUMENTS

| AU | 4837796 | 9/1996 |
| CA | 1182513 A | 2/1985 |
| (Continued) | | |

OTHER PUBLICATIONS

English Machine Translation of DE8436328 from EPO dated May 3, 2020 (7 pages) (Year: 2020).*
(Continued)

*Primary Examiner* — Adam Krupicka
(74) *Attorney, Agent, or Firm* — Troutman Pepper Hamilton Sanders LLP; Ryan A. Schneider; Christopher C. Close, Jr.

(57) ABSTRACT

Disclosed is an artificial tree having a plurality of electrified tree sections that couple together to provide power and/or command signals to devices connected thereto. One or more tree sections may have a trunk portion, one or more electrical connectors having a plurality of terminals, branches, a light string, and an electrical distribution system located at least partially within the trunk portion. A first tree section may be configured to couple to a second tree section such that an electrical connector of the first tree section is in electrical connection with an electrical connector of the second tree section, thereby mechanically and electrically connecting the first tree section to the second tree section such that power and/or the control data are transmitted to the second tree section. Further, each trunk segment may include an axial electrical connector that permits adjacent trunk segments to connect in a plurality of radial orientations relative to each other.

31 Claims, 15 Drawing Sheets

Related U.S. Application Data

No. 15/783,934, filed on Oct. 13, 2017, which is a continuation of application No. 15/272,217, filed on Sep. 21, 2016, which is a continuation of application No. 14/831,625, filed on Aug. 20, 2015, now Pat. No. 9,833,098, which is a continuation-in-part of application No. 13/745,795, filed on Jan. 19, 2013, now Pat. No. 9,173,443, which is a continuation-in-part of application No. 13/288,114, filed on Nov. 3, 2011, now abandoned, which is a continuation-in-part of application No. 12/836,425, filed on Jul. 14, 2010, now Pat. No. 8,053,042, said application No. 14/831,625 is a continuation-in-part of application No. 14/576,661, filed on Dec. 19, 2014, now Pat. No. 9,739,431, and a continuation-in-part of application No. 14/796,950, filed on Jul. 10, 2015, now Pat. No. 9,674,925, which is a continuation of application No. 13/426,577, filed on Mar. 21, 2012, now Pat. No. 9,113,515.

(60) Provisional application No. 61/225,258, filed on Jul. 14, 2009, provisional application No. 61/466,402, filed on Mar. 22, 2011.

(51) Int. Cl.
| | | |
|---|---|---|
| *F21V 23/04* | (2006.01) | |
| *A41G 1/00* | (2006.01) | |
| *H05B 45/00* | (2020.01) | |
| *H05B 45/20* | (2020.01) | |
| *H05B 47/16* | (2020.01) | |
| *H05B 47/155* | (2020.01) | |
| *H05B 47/175* | (2020.01) | |
| *F21S 4/10* | (2016.01) | |
| *F21V 33/00* | (2006.01) | |
| *A47G 33/08* | (2006.01) | |
| *F21W 121/04* | (2006.01) | |
| *F21Y 103/10* | (2016.01) | |
| *F21Y 115/10* | (2016.01) | |
| *F21Y 113/13* | (2016.01) | |

(52) U.S. Cl.
CPC ............ *F21V 23/045* (2013.01); *F21V 23/06* (2013.01); *F21V 33/0028* (2013.01); *H05B 45/00* (2020.01); *H05B 45/20* (2020.01); *H05B 47/155* (2020.01); *H05B 47/16* (2020.01); *H05B 47/175* (2020.01); *A47G 2033/0827* (2013.01); *A47G 2200/08* (2013.01); *F21W 2121/04* (2013.01); *F21Y 2103/10* (2016.08); *F21Y 2113/13* (2016.08); *F21Y 2115/10* (2016.08)

(56) References Cited

U.S. PATENT DOCUMENTS

| | | |
|---|---|---|
| 534,021 A | 2/1895 | Swan |
| 735,010 A | 7/1903 | Zahl |
| 918,083 A | 4/1909 | Palmer |
| 1,456,194 A | 5/1923 | Rosenberg |
| 1,479,420 A | 1/1924 | Nenno |
| 1,495,695 A | 5/1924 | Karr |
| 1,590,220 A | 6/1924 | Wurts |
| 1,656,148 A | 1/1928 | Harris |
| 1,837,890 A | 12/1931 | Baker |
| 1,922,022 A | 8/1933 | Barnett |
| 1,974,472 A | 9/1934 | Seghers |
| 2,025,189 A | 12/1935 | Yanchenko |
| 2,047,045 A | 7/1936 | Veenboer |
| 2,112,281 A | 3/1938 | Ferris |
| 2,151,897 A | 3/1939 | Chaplin |
| 2,188,529 A | 1/1940 | Corina |
| 2,227,123 A | 12/1940 | Christen |
| 2,229,211 A | 1/1941 | Korengold |
| 2,242,597 A | 5/1941 | Quandee |
| 2,275,533 A | 3/1942 | Landy |
| 2,277,532 A | 3/1942 | Smith, Jr. |
| 2,284,837 A | 6/1942 | O'Brien |
| 2,402,766 A | 6/1946 | Moore |
| 2,453,695 A | 11/1948 | Belling |
| 2,453,925 A | 11/1948 | Mendonca |
| 2,481,181 A | 9/1949 | Walter |
| 2,485,460 A | 10/1949 | Rocco |
| 2,515,255 A | 7/1950 | O'Brien et al. |
| 2,533,374 A | 12/1950 | Hyland |
| 2,558,029 A | 6/1951 | Wood |
| 2,563,713 A | 8/1951 | Frei et al. |
| 2,605,386 A | 7/1952 | Syretz |
| 2,679,911 A | 6/1954 | Bhend |
| 2,684,401 A | 7/1954 | Roeser |
| 2,759,095 A | 8/1956 | Kline |
| 2,806,938 A | 9/1957 | Henry |
| 2,857,506 A | 10/1958 | Minteer |
| 2,875,421 A | 2/1959 | Jordan |
| 2,910,842 A | 11/1959 | Senseng |
| 2,932,811 A | 4/1960 | Abraham et al. |
| 2,938,355 A | 5/1960 | Dougherty |
| 2,969,456 A | 1/1961 | Raymaley |
| 2,973,546 A | 3/1961 | Roche |
| 2,977,566 A | 3/1961 | Neumann et al. |
| 3,009,052 A | 11/1961 | Holbrook |
| 3,019,357 A | 1/1962 | Zaffina |
| 3,101,291 A | 8/1963 | Lalick |
| 3,107,966 A | 10/1963 | Bonhomme |
| 3,115,435 A | 12/1963 | Abramson |
| 3,118,617 A | 1/1964 | Hellrich |
| 3,131,112 A | 4/1964 | Abramson |
| 3,133,703 A | 5/1964 | Monroe |
| 3,214,579 A | 10/1965 | Pacini |
| 3,234,073 A | 2/1966 | Raymond et al. |
| 3,290,918 A | 12/1966 | Weasler |
| 3,300,163 A | 1/1967 | Randolf |
| 3,306,206 A | 2/1967 | Grantham |
| 3,390,369 A | 7/1968 | Zavertnik et al. |
| 3,409,867 A | 11/1968 | Lessner |
| 3,470,527 A | 9/1969 | Bonhomme |
| 3,521,216 A | 7/1970 | Tolegian |
| 3,531,759 A | 9/1970 | Hansen |
| 3,571,586 A | 3/1971 | Duckworth |
| 3,585,564 A | 6/1971 | Skjervoll |
| 3,602,531 A | 8/1971 | Patry |
| 3,603,780 A | 9/1971 | Lu |
| 3,617,732 A | 11/1971 | Fisher |
| 3,634,180 A | 1/1972 | DeCosmo et al. |
| 3,640,496 A | 2/1972 | Duncan |
| 3,652,972 A | 3/1972 | Kreider |
| 3,663,924 A | 5/1972 | Gerlat |
| 3,715,708 A | 2/1973 | Lloyd et al. |
| 3,723,723 A | 3/1973 | Lerner |
| 3,735,117 A | 5/1973 | Hunt |
| 3,902,781 A | 9/1975 | Kommern et al. |
| 3,924,882 A | 12/1975 | Ellis |
| 3,928,689 A | 12/1975 | Mottel |
| 3,945,707 A | 3/1976 | Fitzgerald |
| 3,963,321 A | 6/1976 | Burger et al. |
| 3,970,832 A | 7/1976 | Smith |
| 3,970,834 A | 7/1976 | Smith |
| 3,971,619 A | 7/1976 | Rohrssen |
| 3,985,924 A | 10/1976 | Pritza |
| 4,005,923 A | 1/1977 | Davis, Jr. |
| 4,020,201 A | 4/1977 | Miller |
| 4,054,696 A | 10/1977 | Crownover |
| 4,057,665 A | 11/1977 | Szulewski |
| 4,068,118 A | 1/1978 | Carrington |
| 4,072,857 A | 2/1978 | Devicaris |
| 4,097,917 A | 6/1978 | McCaslin |
| 4,109,345 A | 8/1978 | Sargent et al. |
| 4,140,823 A | 2/1979 | Weskamp |
| 4,247,216 A | 1/1981 | Pansini |

(56) References Cited

U.S. PATENT DOCUMENTS

| | | |
|---|---|---|
| 4,318,630 A | 3/1982 | Herchenbach et al. |
| 4,336,974 A | 6/1982 | Wilson |
| 4,385,849 A | 5/1983 | Crain |
| 4,437,782 A | 3/1984 | Geisthoff |
| 4,447,279 A | 5/1984 | Boisvert et al. |
| 4,462,065 A | 7/1984 | Rhodes |
| 4,516,193 A | 5/1985 | Murphy |
| 4,525,773 A | 6/1985 | Hesse et al. |
| 4,545,750 A | 10/1985 | Davis |
| 4,595,248 A | 6/1986 | Brown |
| 4,602,831 A | 7/1986 | Lockard |
| 4,620,270 A | 10/1986 | Laakso |
| 4,636,106 A | 1/1987 | Waisbrod |
| 4,655,515 A | 4/1987 | Hamsher, Jr. et al. |
| 4,662,775 A | 5/1987 | Faul |
| 4,705,483 A | 11/1987 | Davis et al. |
| 4,737,120 A | 4/1988 | Grabbe et al. |
| 4,753,600 A | 6/1988 | Williams |
| 4,772,215 A | 9/1988 | Falk |
| 4,775,922 A | 10/1988 | Engel |
| 4,793,646 A | 12/1988 | Michaud, Jr. |
| 4,805,075 A | 2/1989 | Damore |
| 4,830,626 A | 5/1989 | Liu |
| 4,855,880 A | 8/1989 | Mancusi, Jr. |
| 4,858,086 A | 8/1989 | Pietrantonio et al. |
| 5,015,510 A | 3/1991 | Smith |
| 5,067,906 A | 11/1991 | Woodgate |
| 5,073,129 A | 12/1991 | Szegda |
| 5,088,669 A | 2/1992 | Zinnbauer |
| 5,091,834 A | 2/1992 | Kao |
| 5,149,223 A | 9/1992 | Watts |
| 5,149,282 A | 9/1992 | Donato et al. |
| 5,217,393 A | 6/1993 | Del Negro et al. |
| 5,276,280 A | 1/1994 | Ball |
| 5,300,864 A | 4/1994 | Allen, Jr. |
| 5,306,176 A | 4/1994 | Coffey |
| 5,349,780 A | 9/1994 | Dyke |
| 5,362,251 A | 11/1994 | Bielak |
| 5,431,578 A | 2/1995 | Wayne et al. |
| 5,409,403 A | 4/1995 | Falossi |
| 5,409,745 A | 4/1995 | McGuire |
| 5,422,797 A | 6/1995 | Shattan |
| 5,454,729 A | 10/1995 | Wen-Te |
| 5,455,750 A | 10/1995 | Davis |
| 5,492,429 A | 2/1996 | Hodges |
| 5,517,390 A | 5/1996 | Zins |
| 5,550,720 A | 8/1996 | Carroll |
| 5,603,626 A | 2/1997 | Wayne et al. |
| 5,629,587 A | 5/1997 | Gray et al. |
| 5,639,157 A | 6/1997 | Yeh |
| 5,652,032 A | 7/1997 | Kaczor et al. |
| 5,667,393 A | 9/1997 | Grabbe et al. |
| 5,695,279 A | 12/1997 | Sonnleitner et al. |
| 5,712,002 A | 1/1998 | Reilly, III |
| 5,758,545 A | 6/1998 | Fevre |
| 5,776,559 A | 7/1998 | Woolford |
| 5,776,599 A | 7/1998 | Haluska et al. |
| 5,803,750 A | 9/1998 | Purington et al. |
| 5,855,705 A | 1/1999 | Gauthier |
| 5,878,989 A | 3/1999 | Allman |
| 5,957,562 A | 9/1999 | Hill |
| 5,979,859 A | 11/1999 | Vartanov et al. |
| 6,006,477 A | 12/1999 | Ko |
| 6,030,670 A | 2/2000 | Chang |
| 6,056,427 A | 5/2000 | Kao |
| 6,065,233 A | 5/2000 | Rink |
| 6,068,490 A | 5/2000 | Salzberg |
| 6,091,204 A | 7/2000 | Chen |
| 6,099,920 A | 8/2000 | Kao |
| 6,226,146 B1 | 5/2001 | Landess et al. |
| 6,241,559 B1 | 6/2001 | Taylor |
| 6,257,793 B1 | 7/2001 | Lin |
| 6,273,584 B1 | 8/2001 | Wang et al. |
| 6,323,597 B1 | 11/2001 | Janning |
| 6,354,231 B1 | 3/2002 | Morris |
| 6,418,949 B1 | 7/2002 | Lin |
| 6,457,839 B1 | 10/2002 | Grandoit |
| 6,458,435 B1 | 10/2002 | Lai |
| 6,462,311 B1 | 10/2002 | Emiglio |
| 6,588,914 B1 | 7/2003 | Tang |
| 6,592,094 B1 | 7/2003 | Kao |
| 6,619,876 B2 | 9/2003 | Vaikus et al. |
| 6,652,927 B1 | 11/2003 | Chen |
| 6,695,464 B1 | 2/2004 | Wu |
| 6,733,167 B1 | 5/2004 | Kao |
| 6,752,512 B2 | 6/2004 | Pan |
| 6,773,134 B2 | 8/2004 | Harvey |
| 6,794,574 B2 | 9/2004 | Gust |
| 6,794,825 B1 | 9/2004 | Kao |
| 6,796,683 B2 | 9/2004 | Wood et al. |
| 6,840,663 B2 | 1/2005 | Kao |
| 6,854,916 B2 | 2/2005 | Hsieh |
| 6,869,316 B2 | 3/2005 | Hinkle et al. |
| 6,883,951 B2 | 4/2005 | Wu |
| 6,945,805 B1 | 9/2005 | Bollinger |
| 6,951,405 B2 | 10/2005 | Yao |
| 7,021,598 B2 | 4/2006 | Kao |
| 7,029,145 B2 | 4/2006 | Frederick |
| 7,052,156 B2 | 5/2006 | Primeau |
| 7,055,981 B2 | 6/2006 | Yao |
| 7,066,739 B2 | 6/2006 | McLeish |
| 7,081,027 B2 | 7/2006 | Woodward |
| 7,108,514 B2 | 9/2006 | Chen et al. |
| 7,122,230 B1 | 10/2006 | Maskell |
| 7,074,044 B2 | 11/2006 | Billing et al. |
| 7,132,139 B2 | 11/2006 | Yang |
| 7,144,610 B1 | 12/2006 | Estes et al. |
| 7,186,050 B2 | 3/2007 | Dean |
| 7,192,303 B2 | 3/2007 | Kohen |
| 7,196,477 B2 | 3/2007 | Richmond |
| 7,207,844 B2 | 4/2007 | Peng |
| 7,264,479 B1 | 9/2007 | Lee |
| 7,279,633 B2 | 10/2007 | Waters |
| 7,311,421 B1 | 12/2007 | Fahl |
| 7,311,566 B2 | 12/2007 | Dent |
| 7,318,744 B2 | 1/2008 | Kuo |
| 7,322,720 B1 | 1/2008 | Haddad |
| 7,322,873 B2 | 1/2008 | Rosen et al. |
| 7,361,039 B2 | 4/2008 | Koehler |
| 7,404,686 B2 | 7/2008 | Volum |
| 7,429,827 B2 | 9/2008 | Richmond |
| 7,445,824 B2 | 11/2008 | Leung et al. |
| 7,527,508 B1 | 5/2009 | Lee |
| 7,537,457 B2 | 5/2009 | Rashkover |
| 7,554,266 B1 | 6/2009 | Chen |
| 7,585,187 B2 | 9/2009 | Daily et al. |
| 7,585,552 B2 | 9/2009 | Meseke |
| 7,609,006 B2 | 10/2009 | Gibboney |
| 7,652,210 B2 | 1/2010 | White |
| 7,665,996 B2 | 2/2010 | Jaeger |
| 7,784,961 B1 | 8/2010 | Rawlings |
| 7,819,575 B2 | 10/2010 | Li |
| 7,943,211 B2 | 5/2011 | Chen |
| 7,980,871 B2 | 7/2011 | Li et al. |
| 8,047,700 B2 | 11/2011 | Massabki et al. |
| 8,052,442 B1 | 11/2011 | Li et al. |
| 8,062,718 B2 | 11/2011 | Schooley |
| 8,132,649 B2 | 3/2012 | Rogers |
| 8,226,269 B2 | 7/2012 | Mateer et al. |
| 8,309,188 B2 | 11/2012 | Cheng et al. |
| 8,403,523 B2 | 3/2013 | Gerlach et al. |
| 8,573,548 B2 | 11/2013 | Kuhn et al. |
| 2003/0073325 A1 | 4/2003 | Canizales, Jr. |
| 2004/0002266 A1 | 1/2004 | Hinkle et al. |
| 2005/0148241 A1 | 7/2005 | Kohen |
| 2005/0249892 A1 | 11/2005 | Rocheleau |
| 2006/0048397 A1 | 3/2006 | King et al. |
| 2006/0062940 A1 | 3/2006 | Steiger et al. |
| 2006/0068129 A1 | 3/2006 | Yang |
| 2006/0164834 A1 | 7/2006 | Kao |
| 2006/0264080 A1 | 11/2006 | Peng |
| 2007/0230174 A1 | 10/2007 | Hicks et al. |
| 2007/0253191 A1 | 11/2007 | Chin et al. |
| 2007/0273296 A9 | 11/2007 | Janning |

(56) References Cited

U.S. PATENT DOCUMENTS

| | | |
|---|---|---|
| 2008/0143267 A1 | 6/2008 | Neuman |
| 2008/0149791 A1 | 6/2008 | Bradley |
| 2008/0283717 A1 | 11/2008 | Kim et al. |
| 2009/0023315 A1 | 1/2009 | Pfeiffer |
| 2010/0000065 A1 | 1/2010 | Cheng et al. |
| 2010/0053991 A1 | 3/2010 | Boggs |
| 2010/0072747 A1 | 3/2010 | Krize |
| 2010/0099287 A1 | 4/2010 | Colburn et al. |
| 2010/0157601 A1 | 6/2010 | Robb |
| 2010/0159713 A1 | 6/2010 | Nishihira et al. |
| 2010/0196628 A1 | 8/2010 | Shooley |
| 2010/0271804 A1 | 10/2010 | Levine |
| 2010/0289415 A1 | 11/2010 | Chen |
| 2011/0195204 A1 | 8/2011 | Chen |

FOREIGN PATENT DOCUMENTS

| | | |
|---|---|---|
| CA | 2214074 | 9/1996 |
| CN | 2332290 Y | 8/1999 |
| DE | 843632 U1 | 7/1952 |
| DE | 8436328.2 U1 | 4/1985 |
| DE | 3521216 A1 | 5/1986 |
| DE | 10235081 A1 | 2/2004 |
| DE | 202004003019 U1 | 5/2004 |
| EP | 0920826 A1 | 6/1999 |
| EP | 1049206 A2 | 11/2000 |
| EP | 1586809 A2 | 10/2005 |
| FR | 1215214 A | 4/1960 |
| FR | 2653853 A1 | 5/1991 |
| GB | 591432 A1 | 8/1944 |
| GB | 792079 A | 3/1958 |
| GB | 1569099 A | 6/1980 |
| GB | 2112281 A | 7/1983 |
| GB | 2137086 A | 10/1984 |
| GB | 2169198 A | 7/1986 |
| JP | 1999121123 A | 4/1999 |
| NO | 3182654 A1 | 11/2001 |
| WO | 9626661 A1 | 9/1996 |
| WO | 0182654 A1 | 11/2001 |
| WO | 2002075862 A1 | 9/2002 |
| WO | 03058114 A1 | 7/2003 |
| WO | 2005023062 A2 | 3/2005 |
| WO | 2007043896 A1 | 4/2007 |
| WO | 2007140648 A1 | 12/2007 |
| WO | 2010082049 A1 | 7/2010 |
| WO | 2011015340 A1 | 2/2011 |

OTHER PUBLICATIONS

Mosdesign Semi. M80056B Light Controller (May 14, 2002), filed on Nov. 24, 2016 in IPR2017-00330 as Exhibit No. 1024.

Robert S. Mroczkowski "A Perspective on Connector Reliability" 50th IEEE Holm Conference on Electrical Contacts at Sheraton Hotel, Seattle, Washington USA Sep. 20-23, 2004.

J. Swingler, J.W. McBride, C. Maul "Degradation of road tested automotive connectors", IEEE Transactions on Components and Packaging Technologies, vol. 23, issue 1, pp. 157-164 Mar. 2000 (Abstract only).

R.S. Mroczkowski, J.M. Maynard "Extimating the reliability of electrical connectors", IEEE Transactions on Reliability, vol. 40, issue 5, pp. 507-512, Dec. 1991 (Abstract only).

Holtek HT2040A Christmas Light Controller (Mar. 26, 1997), filed on Nov. 24, 2016 in IPR2017-00330 as Exhibit No. 1023.

Mouser Electronics, Purchasing Manuel 592, 3 pages.

Robert S. Mroczkowski, Electronic Connector Handbook, Theory and Applications, McGraw-Hill., 1998, 12 pages.

* cited by examiner

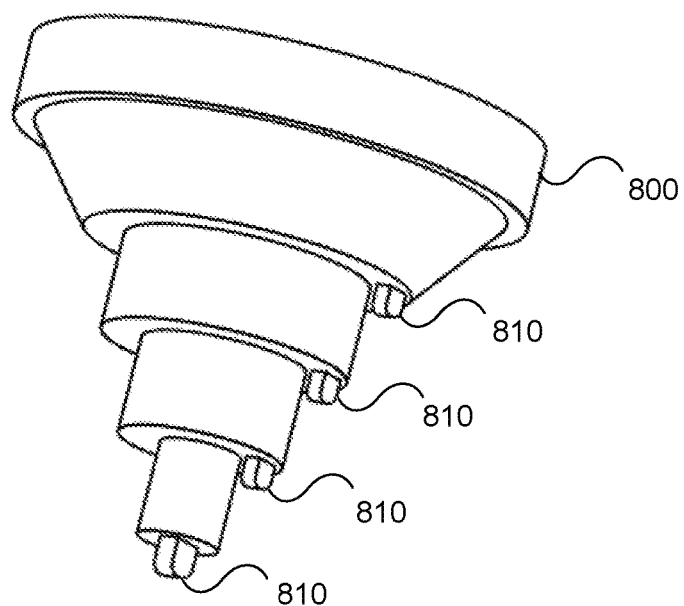
FIG. 8A
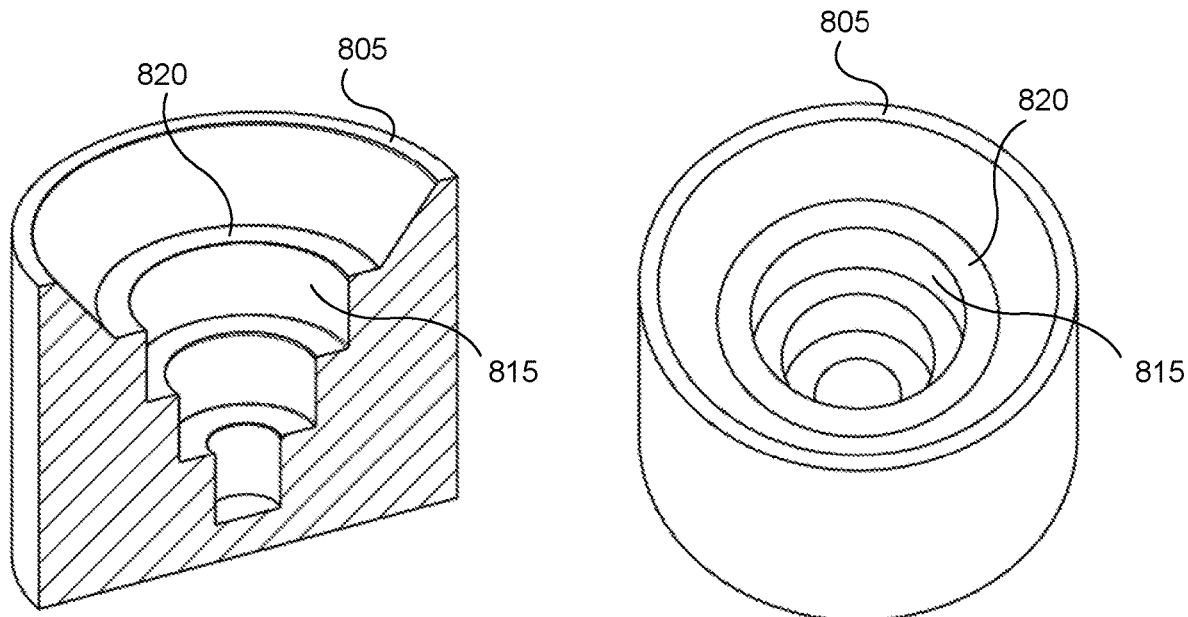
FIG. 8B
FIG. 8C

POWER POLE FOR ARTIFICIAL TREE APPARATUS WITH AXIAL ELECTRICAL CONNECTORS

CROSS-REFERENCE TO RELATED APPLICATIONS

The present application is:

a continuation of U.S. patent application Ser. No. 16/588,440, titled "Power Pole for Artificial Tree Apparatus with Axial Electrical Connectors," filed by Jason Loomis on Sep. 30, 2019, which is a continuation of U.S. patent application Ser. No. 15/783,934, titled "Power Pole for Artificial Tree Apparatus with Axial Electrical Connectors," filed by Jason Loomis on Oct. 13, 2017, which is a continuation of U.S. patent application Ser. No. 15/272,217 titled "Architecture for Routing Multi-Channel Commands Via a Tree Column," filed by Jason Loomis on Sep. 21, 2016, which is a continuation of U.S. patent application Ser. No. 14/831,625, now U.S. Pat. No. 9,833,098, titled "Architecture for Routing Multi-Channel Commands Via a Tree Column," filed by Jason Loomis on Aug. 20, 2015, which is a continuation-in-part of U.S. patent application Ser. No. 13/745,795, now U.S. Pat. No. 9,173,443, titled "Architecture for Routing Multi-Channel Commands Via a Tree Column," filed by Jason Loomis on Jan. 19, 2013, which is a continuation-in-part of U.S. patent application Ser. No. 13/288,114 titled "Artificial Tree Apparatus with Axial Electrical Connectors," filed by Jason Loomis on Nov. 3, 2011, which is a continuation-in-part of U.S. patent application Ser. No. 12/836,425, now U.S. Pat. No. 8,053,042, titled "Artificial Tree Apparatus," filed by Jason Loomis on Jul. 14, 2010, which claims benefit of U.S. Provisional Application Ser. No. 61/225,258 titled "Artificial Tree Apparatus," filed by Jason Loomis on Jul. 14, 2009.

U.S. patent application Ser. No. 14/831,625, now U.S. Pat. No. 9,833,098, is also a continuation-in-part of U.S. patent application Ser. No. 14/576,661, now U.S. Pat. No. 9,739,431, titled "Modular Light-String System Having Independently Addressable Lighting Elements," filed by Loomis, et al. on Dec. 19, 2014.

U.S. patent application Ser. No. 14/831,625, now U.S. Pat. No. 9,833,098, is also a continuation-in-part of U.S. patent application Ser. No. 14/796,950, now U.S. Pat. No. 9,674,925, titled "Low Voltage Coupling Design," filed by Long, et al. on Jul. 10, 2015, which is a continuation of U.S. patent application Ser. No. 13/426,577, now U.S. Pat. No. 9,113,515, titled "Low Voltage Coupling Design," filed by Long, et al. on Mar. 21, 2012, which claims benefit of U.S. Provisional Application Ser. No. 61/466,402 titled "Low Voltage Coupling Design," filed by Long, et al. on Mar. 22, 2011.

This application incorporates the entire contents of the foregoing application(s) herein by reference.

TECHNICAL FIELD

Various embodiments relate generally to improved coupling arrangements for the trunk portions of artificial trees in which sections may easily connect and/or may carry power and/or any other important electrical information or commands via the tree column.

BACKGROUND

It has become commonplace in both residential and commercial environments to incorporate plants in both indoor and outdoor spaces. Plants can serve various useful purposes, such as for example, providing decoration both for everyday and holiday occasions, providing health benefits through the release of oxygen, as well as creating a more relaxing environment through actual and placebic effects of the plant. In cases where a live plant cannot or is preferred not to be accommodated, artificial plants or trees can be a popular choice. A popular instance in which to use an artificial tree is in the use of an artificial holiday tree. Many people choose to decorate their tree in accordance with the holiday season.

SUMMARY

Apparatus and associated methods may relate to an artificial tree apparatus having a plurality of trunk segments that, upon secure mechanical coupling into a column, couple a plurality of independent information channels and/or command signals via the column. In an illustrative example, one or more branch segments having light emitting devices may be connected to the trunk segments. A plurality of branch segments may receive independent signals transmitted from a control system. In some implementations, some of the signals generated by the control system may include command data associated with a predetermined illumination pattern. In some embodiments, each branch segment load may be independently controlled via a multi-channel arrangement. In various implementations, each trunk segment may include an axial connector that permits adjacent trunk segments to be mechanically coupled from any radial orientation relative to a longitudinal axis of the column.

Various embodiments may achieve one or more advantages. For example, some embodiments may output complex output patterns (e.g., lights, sounds, motions) by coordinated modulation of phase, amplitude, and/or waveform command signals conveyed to independent load devices associated with an artificial tree, for example. Some embodiments may permit the user to manually configure each command signal directly at the main controller. In some examples, the user may have the option to manually configure independent loads or branch segments via a control interface disposed in close proximity to an inter-connection point, for example, between the branch segment and the trunk segment. Various embodiments may advantageously provide an improved coupling arrangement for the trunk portions of an artificial tree, for example, in which each section, besides connecting easily, carries current and any other important signal, including but not limited to electrical information or commands, via the tree column. Certain embodiments facilitate simplified assembly and disassembly of the trunk column by introducing self-aligning electro-mechanical interfaces into the trunk segments, which may include multi-channel electromagnetic coupling systems for communicating multiple channels of commands and/or information across the interface between adjacent trunk segments. Various embodiments may advantageously provide high performance multi-channel control capabilities while substantially simplifying and reducing complexity, effort, hassle, and time required to assemble a fully functioning, self-standing display. More-over, ergonomic safety may be enhanced by eliminating the need to align two bulky objects, and electrical safety hazards may be reduced, for example, by integrating electrical conductors within the tree column.

The details of various embodiments are set forth in the accompanying drawings and the description below. Other features and advantages will be apparent from the description and drawings, and from the claims.

BRIEF DESCRIPTION OF THE DRAWINGS

FIGS. 8A, 8B, and 8C depict another exemplary orientation-independent multi-channel signal interface connection assembly.

Like reference symbols in the various drawings indicate like elements.

DETAILED DESCRIPTION OF ILLUSTRATIVE EMBODIMENTS

To aid understanding, this document is organized as follows. First, an exemplary artificial tree featuring multi-channel axial electrical interfaces and multi-channel signal path(s) integrated within the central pole is briefly introduced with reference to FIGS. 1-2. Then, with reference to FIGS. 3-4, exemplary user interfaces that permit selection of a preferred light pattern channel for singular or group of branch segments are described. Next, the discussion turns to an exemplary embodiment of a controller in FIG. 5. Then, with reference to FIG. 6, further explanatory discussion is presented to explain exemplary processing of multi-channel signal(s) received from the controller. Then, with reference to FIGS. 7A-10D, various orientation-independent and self-aligning connection assemblies are illustrated for use with a single or multi-channel artificial tree apparatus. An exemplary multichannel system is described with reference to FIG. 11. Finally, FIGS. 12-16 depict exemplary configurations for distributing operating power and serial control commands to individual light string elements.

Figure 1:
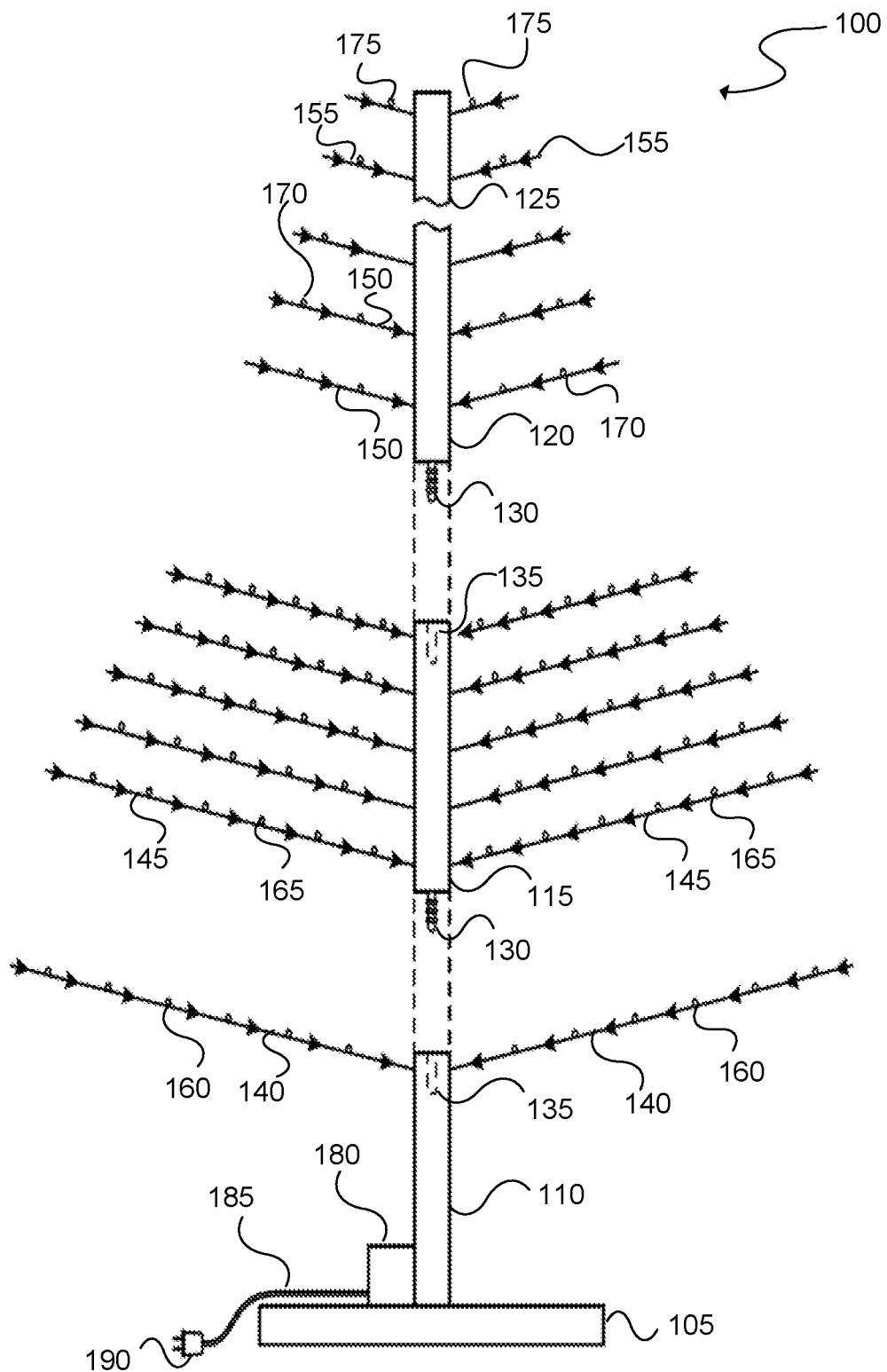
FIG. 1 depicts, in an exploded view, an exemplary artificial tree apparatus with multi-channel signals distributed via the tree column.

FIG. 1 depicts, in an exploded view, an exemplary artificial tree apparatus with multi-channel signals distributed via the tree column. An artificial tree apparatus 100 provides decoration and dynamic, complex, time-varying, multi-channel illumination. In an exemplary embodiment, the artificial tree apparatus 100 is in the shape of a Christmas tree, although the loads could be applied to another decoration, edifice, or substrate. By way of example and not limitation, the artificial tree apparatus 100 of this example may be of various heights, such as for example 2, 3, 4, 5, 6, 7, or 8 feet in overall height.

The artificial tree apparatus 100 includes a base 105 for providing self-standing upright support of the artificial tree apparatus 100. In some embodiments, the base 105 may be secured rigidly to a floor surface. In other embodiments, the base 105 may be movable along the floor surface. Although not shown in this example, the base 105 may rotate the tree about its longitudinal axis. In such event, the electrical contact may be maintained, for example, via slip ring contacts, to avoid twisting of an electrical cord.

Extending vertically from the base 105 is a plurality of trunk segments 110, 115, 120, 125. The number of trunk segments 110, 115, 120, 125 may depend upon the overall height preference of the artificial tree apparatus 100. In some exemplary embodiments, only 2-3 trunk segments may be used. In other exemplary embodiments, 4-6 trunk segments may be used to achieve a greater overall height of the artificial tree apparatus 100. The length of each trunk segment 110, 115, 120, 125 may be the same in some exemplary embodiments. The trunk segments 110, 115, 120, 125 may employ a circular cross-section in some exemplary embodiments. The circular cross-section of the trunk segments 110, 115, 120, 125 permits the trunk segments to be connected in any radial orientation relative to the connecting trunk segments 110, 115, 120, 125 that are being connected in a non-radial dependent manner.

Other cross-sectional shapes may provide for a more limited connection arrangement. For example, a square cross-sectional shape of the trunk segments would only permit 4 radially different positions of adjacent-connecting trunk segments. Examples that incorporate orientation-dependent alignment of trunk segments are described with reference, for example, to at least FIG. 2 of U.S. Pat. No. 8,053,042, to Loomis, J., the entire contents of which are incorporated herein by reference.

In another exemplary embodiment, some trunk segments 110, 115, 120, 125 may be shorter or longer than other trunk segments 110, 115, 120, 125 to achieve a desired visual and/or lighting effect. For example, the trunk segments 110, 115, 120, 125 may be assembled in a preferred order of emitted light pattern. Different trunk segments 110, 115, 120, 125 may be pre-programmed (e.g., hard-wired or executing a programmed set of instructions stored on a data store) to output a different predetermined light pattern scheme, for example. Such schemes may involve a visually perceptible effect based on, for example, a combination of spectral, temporal (e.g., phase, frequency), and modulation waveform differentiations. A first trunk segment may be configured to output green light, a second trunk segment may be configured to output red light, and a third trunk segment may be configured to output blinking white light, for example. The term "light pattern" herein may refer to various lighting effects, such as for example the light color, the light hue, the light increasing or decreasing brightness or intensity, the light on/off sequence, such as blinking fast, blinking slow, or other lighting effects such as simply turning the light on or off As shown, each trunk segment 110, 115, 120, 125 includes an axial electrical connector 130 configured as a plug to mate with another axial electrical connector 135 configured as a socket. In assembly, the trunk segments 110, 115, 120, 125 and respective axial electrical connectors 130, 135 longitudinally align when being connected. The plug axial electrical connector 130 may be oriented in any radial position relative the socket axial electrical connector 135 when connecting trunk segments 110, 115, 120, 125, thus being non-radial dependent. By permitting independent and free rotation of the axial electrical connectors 130, 135 during assembly, the artificial tree apparatus 100 becomes easy and quick to assemble. Furthermore, the axial symmetry permits the user a degree of freedom to independently adjust the relative angle between any of the segments 110-125, as may be desired by the user.

Extending from each trunk segment 110, 115, 120, 125 are one or more branch segments 140, 145, 150, 155. In an exemplary embodiment, the branch segments 140, 145, 150, 155 are shaped to resemble tree limbs. For example, the branch segments 140, 145, 150, 155 may be shaped to resemble Pine tree boughs.

In the depicted embodiment, each branch segment 140, 145, 150, 155 includes one or more integral light emitting devices 160, 165, 170, 175 for emitting a light pattern. In some embodiments, the light emitting devices 160, 165, 170, 175 may include light emitting diodes (LEDs). In some embodiments, the light emitting devices 160, 165, 170, 175 may include incandescent bulbs. Each load of the light emitting devices 160, 165, 170, 175 may be configured to emit a predetermined light patterns that may be different (e.g., independent) with respect to the other light emitting devices 160, 165, 170, 175 on the same or different branch segment 140, 145, 150, 155. For example, a first group of lighting devices 160 on a first group of branch segments 140 may output a slow blinking light pattern in a red color. A second group of lighting devices 165 on a second group of branch segments 145 may output a fast blinking light pattern in a blue color. A third group of lighting devices 170 on a third group of branch segments 150 may output an alternately increasing and decreasing intensity green light pattern. A fourth group of lighting devices 175 on a fourth group of branch segments 155 may output a non-periodic (e.g., constant) white light pattern.

In the case that one or more light emitting devices 160, 165, 170, 175 or strings of light emitting devices burn-out, the branch segment 140, 145, 150, 155 may be removed from the trunk segment 110, 115, 120, 125 and a replacement branch segment may be connected.

The artificial tree apparatus 100 includes a control system 180 to generate and transmit command signals to the light emitting devices 160, 165, 170, 175. In some embodiments, the control system 180 may include a controller located at (or within) the base 105 of the artificial tree apparatus 100. The command signals may be sent through internal wiring extending within the trunk segments 110, 115, 120, 125 and the branch segments 140, 145, 150, 155 to the light emitting devices 160, 165, 170, 175. The axial electrical connectors 130, 135 provide a pathway between trunk segments 110, 115, 120, 125 for the command signals, which may include power, data, and/or control signals in analog and/or digital formats. In some exemplary embodiments, the control system 180 is located within the base 105 of the artificial tree apparatus 100. The control system 180 permits independent operation of the light emitting devices 160, 165, 170, 175. In an exemplary embodiment, the control system 180 generates and transmits a first command signal that is transmitted to a first group of light emitting devices 160 upon the first branch segments 140 and generates a separate and distinct command signal that is transmitted to a second group of light emitting devices 165 upon the second branch segments 145.

A power cord 185 and plug 190 is shown to provide power to the light emitting devices 160, 165, 170, 175 and to the control system 180. In an exemplary embodiment, AC power received by the power cord 185 and plug 190 may be converted to low voltage DC power and then delivered to the light emitting devices 160, 165, 170, 175. The low voltage DC power causes the light emitting devices 160, 165, 170, 175 to illuminate at the pre-determined light pattern. In other exemplary embodiments, a battery pack may be provided to power the control system 180 and/or the light emitting devices 160, 165, 170, 175.

The artificial apparatus 100 provides a coupling arrangement of the trunk segments 110, 115, 120, 125 to permit independent relative rotation of adjacent connecting trunk segments 110, 115, 120, 125 thus permitting easy connection in that the adjacent trunk segments 110, 115, 120, 125 may be connected at and operate from any radially angular position relative to each other and to the longitudinal axis. Additionally, the coupling arrangement provides for electrical current and other important command information to be carried via internal pathways and connectors 130, 135 extending within and from each of the trunk segments 110, 115, 120, 125.

Figure 2:
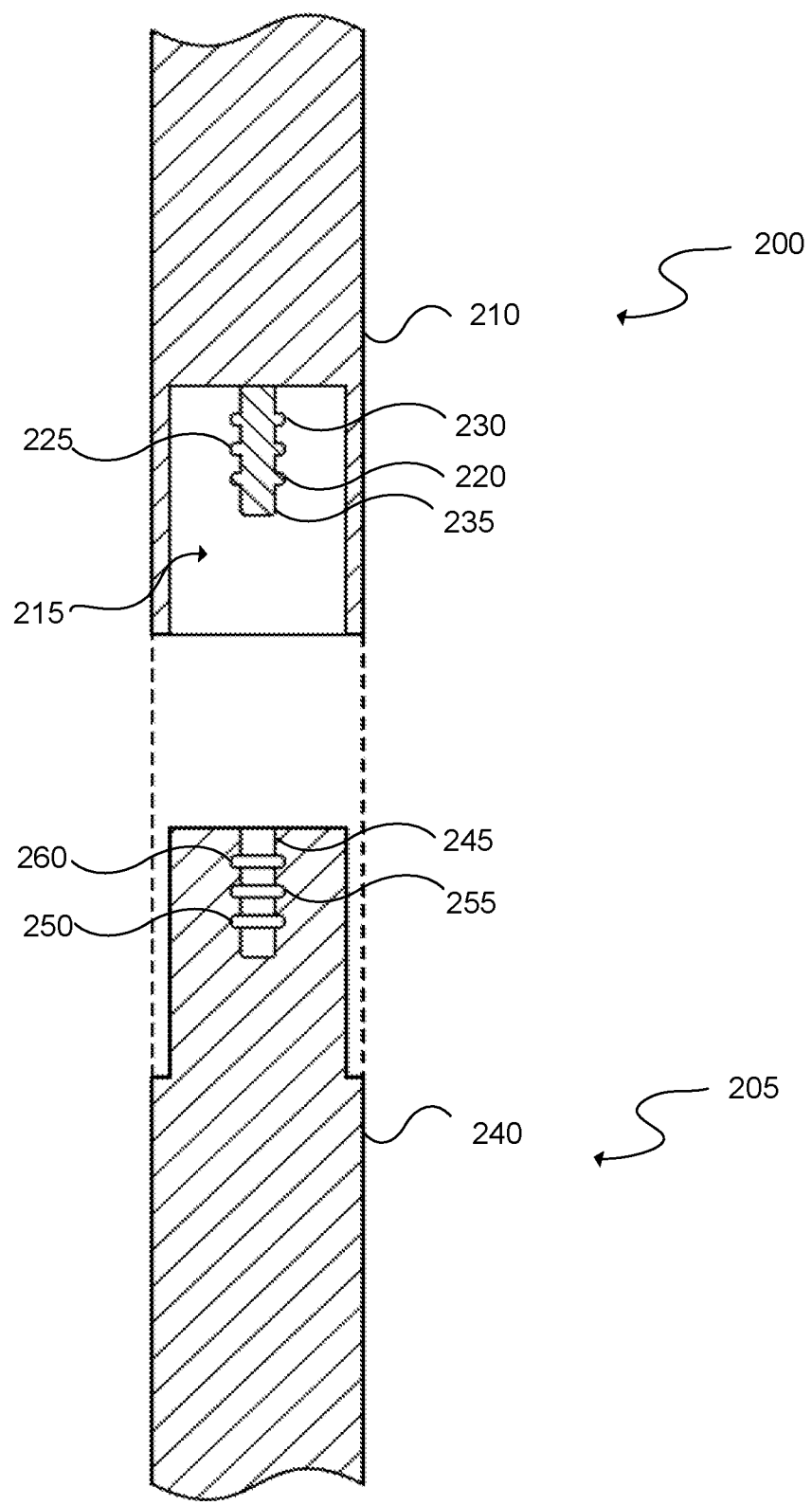
FIG. 2 depicts exemplary first and second trunk segments longitudinally aligned for connection.

FIG. 2 depicts exemplary first and second trunk segments longitudinally aligned for connection. A first trunk segment 200 is configured to electrically and mechanically attach to a second trunk segment 205 while permitting the first trunk segment 200 to be positioned at any radial angle (e.g., non-radial dependent) relative to the second trunk segment 205 and still employ a secure electrical and mechanical connection. The trunk segments are substantially aligned and symmetric with respect to a longitudinal axis. For example, the first trunk segment 200 may be positioned at a 0 degree radial angle relative to a reference point upon the second trunk segment 205. In another example, the first trunk segment 200 may be positioned at a 90 degree radial angle relative to the same reference point upon the second trunk segment 205 and still employ the same electrical and mechanical connection as the relative 0 degree angle connection.

In the depicted example, the first trunk segment 200 includes a hollow sleeve 210 extending from one end. The sleeve 210 extends along a longitudinal axis of the first trunk segment 200. Extending from the first trunk segment 200 within the sleeve 210 is a first axial electrical connector 215 in the shape of a (male) plug. The first axial electrical connector 215 is concentric with the sleeve 210 to permit free radial rotation about the longitudinal axis and relative the second trunk segment 205 during or after attachment. The first axial electrical connector 215 includes a plurality of contacts 220, 225, 230, each separated by an insulator 235. Each contact 220, 225, 230 may be configured to carry an independent electrical signal. In an exemplary embodiment, a first contact 220 is configured to carry a power signal, a second contact 225 is configured for ground (e.g., signal return), and a third contact 230 is configured to carry an electrical command signal representative of a light pattern.

The longitudinally recessed location of the first axial electrical connector 215 within the sleeve 210 protects the first axial electrical connector 215 from damage during assembly, disassembly, and storage of the trunk segments 200, 205, and ensures proper coaxial alignment of the axial electrical connector 215 prior to engagement. In addition, the overlapping stability of the cylindrical walls of the corresponding trunk segments 200, 205 provides greater strength and stability to the coupled trunk segments 200, 205 of the artificial tree apparatus when installed.

The second trunk segment 205 includes a diametrically recessed portion 240 along an end which has a lesser outer diameter than the inner diameter of the sleeve 210 of the first trunk segment 200 such that the recessed portion 240 is received within the sleeve 210. Extending inwardly from the end of the second trunk segment 205 is a second axial electrical connector 245 in the shape of a (e.g., female) socket for receiving the first axial electrical connector 215. The first axial electrical connector 215 of the first trunk segment 200 is recessed some distance from the end of the first trunk segment 200 and within the internal cavity of the sleeve 210 so that the first trunk segment 200 can slide onto the recessed portion 240 of the second trunk segment 205 and engage the second trunk segment 205 to mate the first axial electrical connector 215 with the second axial electrical connector 245 of the second trunk segment 205. The reduced diameter recessed portion 240 of the second trunk segment 205 can freely rotate within the sleeve 210 of the first trunk segment 200 even when the first and second axial electrical connectors 215, 245 are fully coupled together.

Like the first axial electrical connector 215, the second axial electrical connector 245 includes a corresponding plurality of contacts 250, 255, 260 to electrically connect with respective contacts 220, 225, 230 of the first axial electrical connector 215. The provision of single or multiple channels carried on the single axial plug of the first axial electrical connector 215 and the corresponding axial socket of the second axial electrical connector 245 enables free rotation of the axial electrical connectors 235, 245, obviating the need to rotationally align the trunk segments 200, 205 prior to assembly of the artificial tree apparatus.

In various embodiments, releasable galvanic communication may be made between corresponding contact terminals of the connectors 215, 245 by, for example, by employing compliant contacts that provide adjustable radial depth to accommodate axial connection and disconnection.

Figure 3:
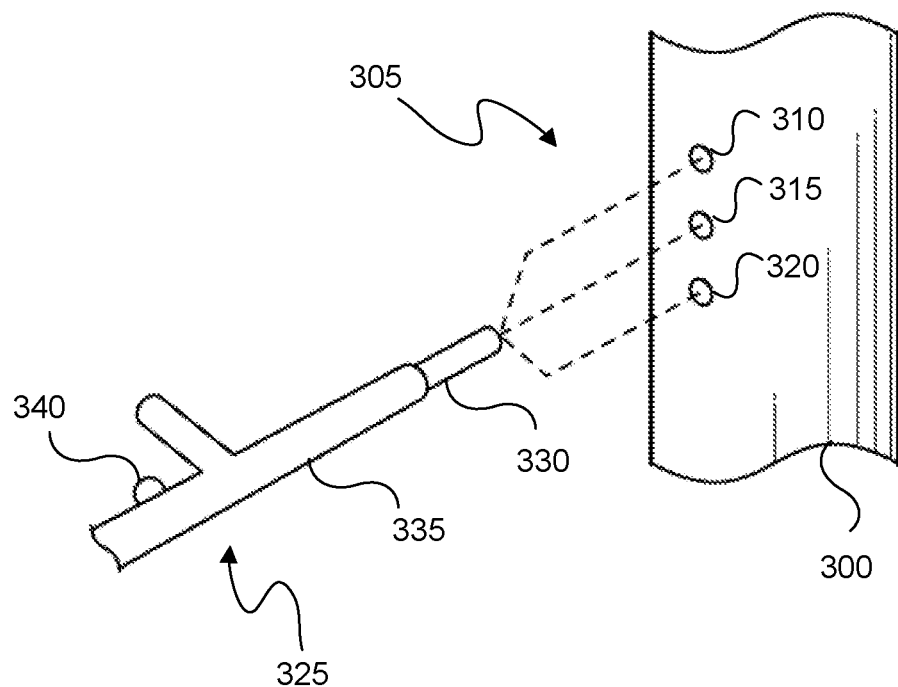
FIG. 3 depicts an exemplary branch segment for coupling to a trunk segment with a user interface.

FIG. 3 depicts an exemplary branch segment for coupling to a trunk segment with a user interface. A trunk segment 300 is shown having a user interface 305 with a first radial receptacle 310, a second radial receptacle 315, and third radial receptacle 320. The first radial receptacle 310 may connect to a first signal wire internal to the trunk segment 300 that is configured to carry a first electrical command signal. The second radial receptacle 315 may connect to a second signal wire internal to the trunk segment 300 that is configured to carry a second electrical command signal. The third radial receptacle 320 may connect to a third signal wire internal to the trunk segment 300 that is configured to carry a third electrical command signal. The electrical command signals may be different from each other to represent different light patterns. Each branch segment 325 may be connected to a preferred radial receptacle 310, 315, 320 thus permitting different branch segments 325 to emit different light patterns by the respective electrical command signals. In some implementations, the radial receptacles 310-320 may carry a plurality of signals, for example, including power and at least one data signal containing encoded information associated with a command signal for modulating the load output intensity, for example.

For example, the first electrical command signal may be representative of a first light color, the second electrical command signal may be representative of a second light color, and the third electrical command signal may be representative of a third light color. In another exemplary embodiment, the first electrical command signal may be representative of a blinking light, the second electrical command signal may be representative of a solid light, and the third electrical command signal may be representative of a modulating light.

In the depicted example, a radial plug 330 extends from the branch segment 325. The branch segment 325 may include a branch member 335 to mimic the shape of a tree branch. The branch segment 325 has one or more light emitting devices 340. The radial plug 330 is connected via insertion to the user-selected radial receptacle 310, 315, 320 that is configured to emit the preferred electrical command signal. If a different electrical command signal is later preferred, the radial plug 330 may be removed from the radial receptacle 310, 315, 320 currently in use and reinserted into a different radial receptacle 310, 315, 320. If all radial receptacles 310, 315, 320 corresponding to the same electrical command signal on each trunk segment 300 are desired to be altered to correspond to a different electrical command signal, a control system may be configured to output a different electrical command signal to the corresponding group of radial receptacles 310, 315, 320. In some exemplary embodiments, the user interface 305 and radial receptacles 310, 315, 320 form a portion of the control system.

Figure 4:
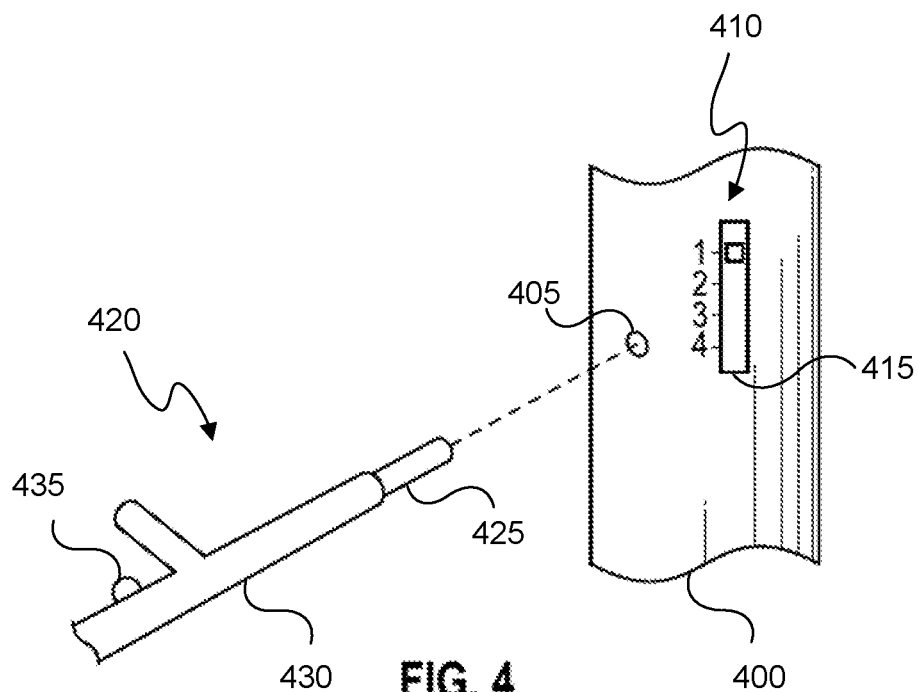
FIG. 4 depicts another exemplary branch segment for coupling to a trunk segment with a user interface.

FIG. 4 depicts another exemplary branch segment for coupling to a trunk segment with a user interface. A trunk segment 400 is shown having a radial receptacle 405 and a user interface 410 comprising a multi-position control switch 415. As shown, the control switch 415 includes a first position, a second position, a third position, and a fourth position. The first position may be representative of a first electrical command signal, the second position may be representative of a second electrical command signal, the third position may be representative of a third electrical command signal and the fourth position may be representative of a fourth electrical command signal.

A branch segment 420 having a radial plug 425 is aligned with the radial receptacle 405. The branch segment 420 includes a branch member 430 for carrying one or more light emitting devices 435. The radial plug 425 is connected via insertion to the radial receptacle 405. The control switch 415 position is adjusted to output a corresponding electrical command signal to the light emitting devices 435 upon the branch segment 420. If the light pattern is desired to be changed, the control switch 410 may be adjusted to output a different electrical command signal. If none of the electrical command signals available via the control switch 410 positions are desired, a control system may be configured to correspond one or more of the control switch 410 positions with an alternative electrical command signal corresponding to a different light modulation or pattern. In some exemplary embodiments, the user interface 410 and radial receptacle 405 may form a portion of the control system. In various embodiments, the user interface 415, alone or integrated with a controller, may advantageously be disposed at a convenient height for access by a user in a standing position, which may be, for example, one meter or more above the floor on which the base is resting. In some embodiments, the controller may be hidden by decorative or ornamental items on or proximate the controller housing.

Figure 5:
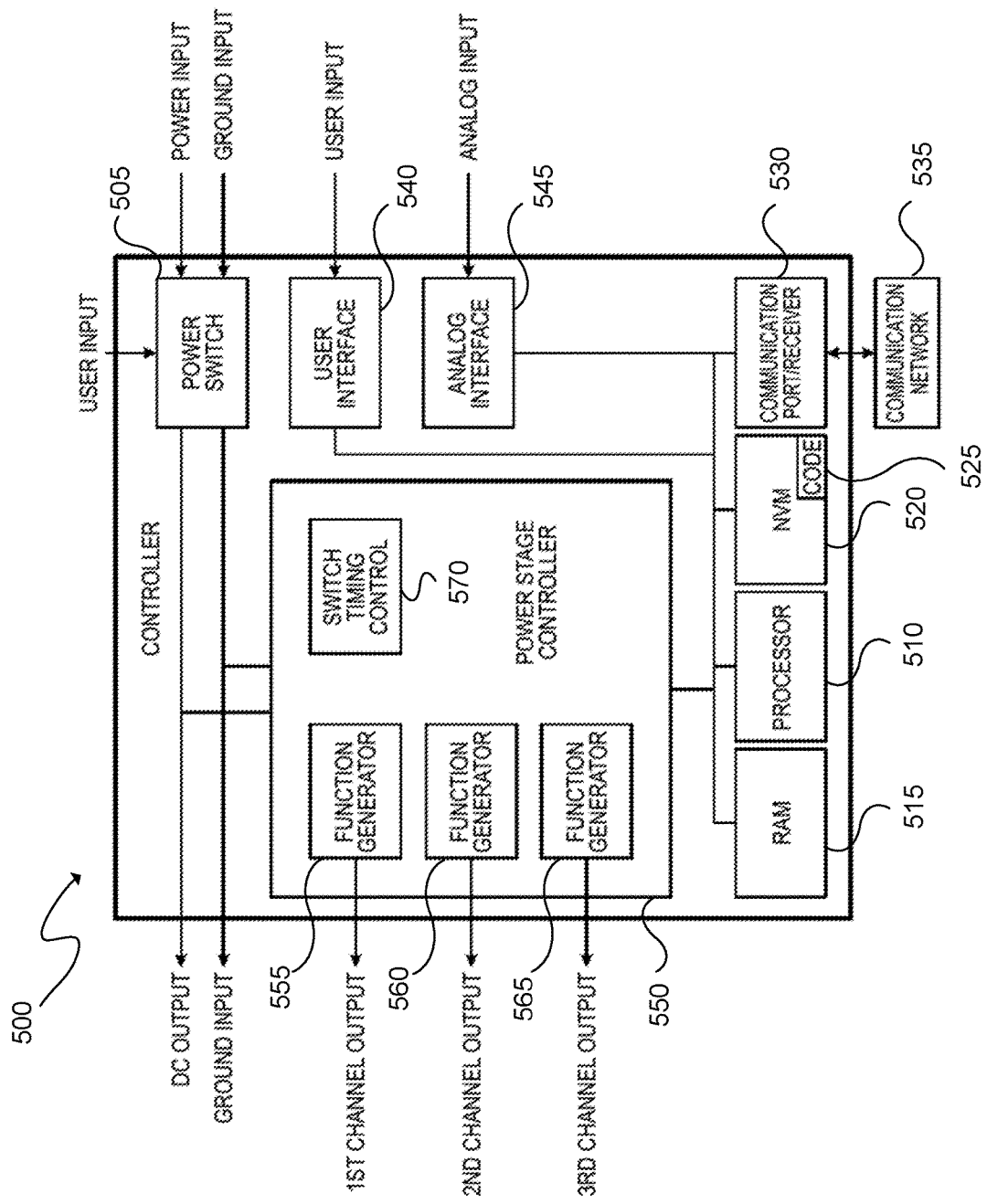
FIG. 5 depicts an exemplary controller used in a control system for outputting independent multi-channel signals.

FIG. 5 depicts an exemplary controller used in a control system for outputting independent multi-channel signals. A controller 500 is shown which may form an entire or a portion of a control system used to generate, process, and/or transmit one or more channels of command signals for distribution via the central trunk segments to loads, which may include light strings capable of illuminating light patterns in response to the command signals. The controller 500 includes a power input and a ground input that may lead to a power switch 505 controlled by user input.

In various implementations, the power input signal may be AC or DC. If required, the controller 500 may include an AC to DC converter to convert the input power. Further power conditioning may be incorporated, for example, to provide appropriate filtering, power factor correction, electromagnetic interference suppression/mitigation, and/or attenuation or boosting, as appropriate for the application. In some embodiments, outputs of the controller may be configured to regulate or limit current and/or voltage supplied to a particular load. In some embodiments an upstream controller 500 may control operation of the power switch 505.

Output from the controller 500 includes a DC output and a ground output. In some embodiments, the DC output may pass-through and be substantially the same amplitude as the Power Input (DC) voltage such that the DC passes-through the controller 500 without being substantially attenuated. In some embodiments, the power switch 505 may be omitted.

The controller 500 depicted in this example is programmable and includes a processor 510 (e.g., CPU), random access memory (RAM) 515, non-volatile memory (NVM) 520 which may have embedded code 525, and a communications port 530. The processor 510 may receive and execute the code 525 to perform various digital or analog control functions. The processor 510 may be a general purpose digital microprocessor 510 which controls the operation of the controller 500. The processor 510 may be a single-chip processor 510 or implemented with multiple components. Using instructions retrieved from memory, the processor 510 may control reception and manipulations of input data and the output data or excitation signals. RAM may be used by the processor 510 as a general storage area and as scratch-pad memory, and can also be used to store input data and processed data.

The exemplary controller 500 also includes a user interface 540 controlled by user input and an analog interface 545 controlled by analog input. The user interface 540 may include dials, such as for example timing dials, frequency dials, or amplitude control dials. The user interface 540 may include switches or control buttons, such as for example amplitude changing controls, channel changing controls, or frequency changing controls. The switches or control buttons may correspond to various light patterns that may involve, for example, light colors, modulation patterns (e.g., pulsed, triangular, sinusoidal, or rectangular waveforms), light intensities, or light blinking rates. The user interface 540 and the analog interface 545, as well as the processor 510, memory, and communications are connected to a control module 550.

A communications network 535 may communicate with the communications port 530 and may be utilized to send and receive data over a network 535 connected to other controllers 500 or computer systems. An interface card or similar device and appropriate software may be implemented by the processor 510 to connect the controller 500 to an existing network 535 and transfer data according to standard protocols. The communications network 535 may also communicate with upstream or downstream controllers 500, such as for example to activate or deactivate upstream or downstream controllers 500. In some embodiments, the communications network 535 may be suited for routing master-slave commands to or from the downstream controller 500. In the embodiment, the controllers 500 may include suitable circuitry for interpreting the master-slave command. Commands sent to upstream or downstream controllers 500 may be sent through power line carrier modes, optical (e.g., infrared, visible), sound (e.g., audible, ultrasonic, subsonic modulation), or wireless (e.g., Bluetooth, Zigbee) modes, for example.

The exemplary control module 550 includes a plurality of function generators 555, 560, 565 each for outputting one or more predetermined or user-configured waveforms to a corresponding channel. In one mode, the function generators 555, 560, 565 may operate independently of one another. In a second mode, the function generators 555, 560, 565 may operate with, for example, different temporal, phase shift, or waveforms aspects. In some examples, some or all of the function generators 555-565 may be synchronized to each other, or to external clock source signal, for example. The function generators 555, 560, 565 may receive pre-stored data for outputting predetermined waveforms or may receive user-configured data from user input to generate unique and customizable waveforms. In some embodiments, the waveforms generated may be electrical waveforms which control and regulate output lumens from one or more lights upon a light string. In some examples, the control module 550 may also include a switch timing control 570 which may use a duty cycle to generate control signals for use by the function generators 555, 560, 565. In some embodiments, the control signals may be timed to produce predetermined current waveforms at predetermined frequencies or intervals. By way of example and not limitation, exemplary composite effects may include, but are not limited to, walking, waterfall, random, or a combination of such effects.

In some embodiments, the waveforms generated by the function generators 555, 560, 565 may comprise one or more frequencies. In some embodiments, the waveforms generated may cause a blinking effect among the connected lights. In some embodiments, the waveforms generated may cause a steady-on effect among the connected lights. In some embodiments, the waveforms generated may cause a dimming effect among the connected lights. In some embodiments, the waveforms generated may cause a dimming effect followed by a steady-on effect among the connected lights. In some embodiments, the waveforms generated may cause a blinking effect followed by a dimming effect followed by a steady-on effect among the connected lights.

Figure 6:
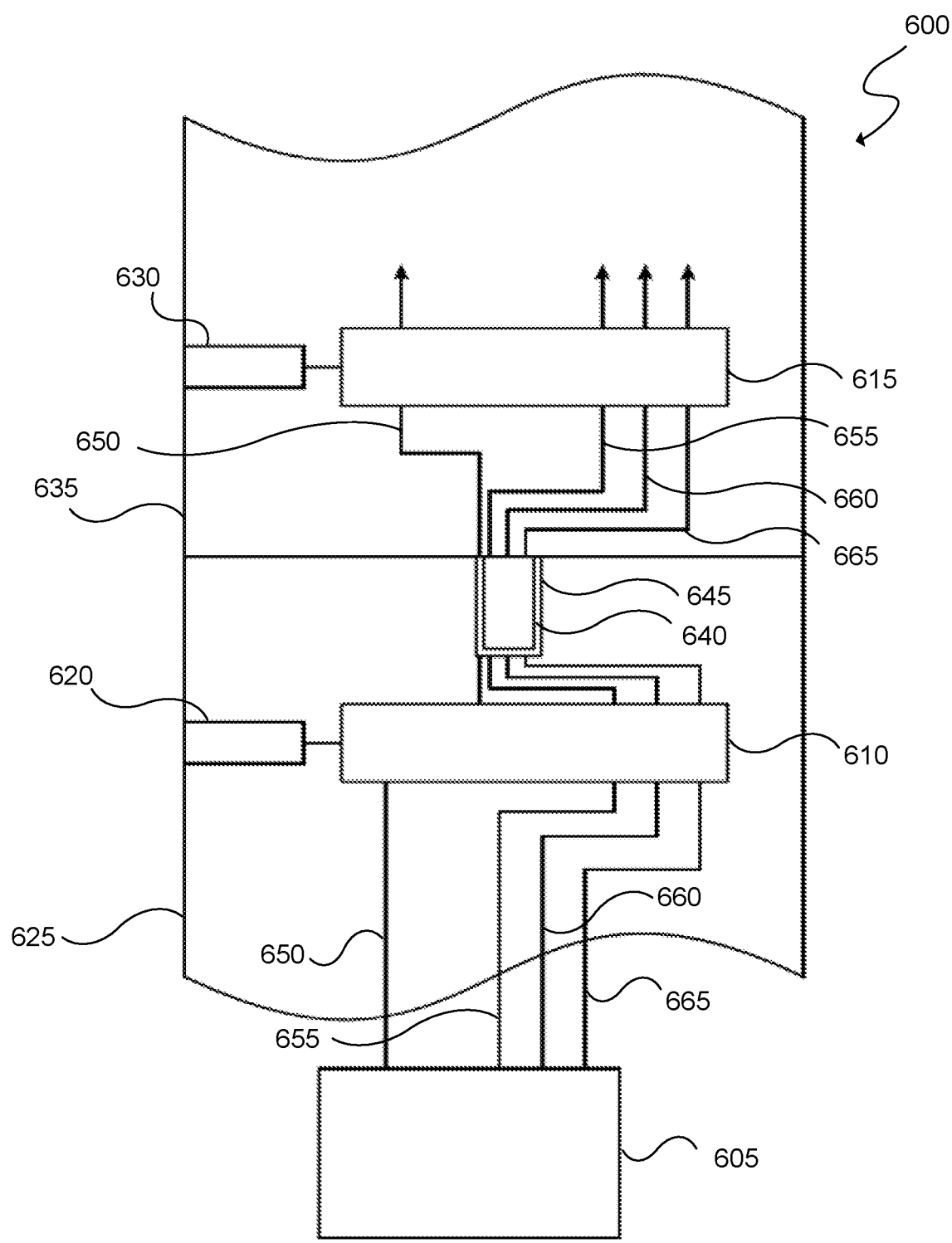
FIG. 6 depicts another exemplary system for processing independent multi-channel signals.

FIG. 6 depicts another exemplary system for processing independent multichannel signals. A control system 600 includes a main controller 605 and a plurality of multiplexers 610, 615 that may receive addressed command signals from the main controller 605 and output electrical command signals, for example as via a buffer or a pass-through. In the depicted example, the first multiplexer module 610 and associated circuitry is electrically connected to radial receptacles 620 on a first trunk segment 625. A second multiplexer module 615 and associated circuitry is electrically connected to a radial receptacle 630 on a second trunk segment 635. The trunk segments 625, 635 may be electrically connected via the exemplary axial electrical connectors 640, 645.

Each multiplexer 610, 615 is in signal communication with the controller 605 via a command wire 650 and a plurality of channel wires 655, 660, 665. The command wires 650 may carry an electrical command signal indicative of a command for a specific addressed multiplexer 610, 615 to read and transmit a specific channel wire 655, 660, 665. Power and ground wires may also be incorporated within one or more of the command or channel wires 650, 655, 660, 665, or incorporated as stand-alone wires to provide power to the light emitting devices and internal circuitry. The wires and circuitry are located internal to the trunk segments 625, 635 and may be internal or be routed along axial electrical connectors 640, 645 connecting the trunk segments 625, 635.

In some implementations, the command wire 650 may also serve as a power delivering signal from a low impedance source so as to deliver operating voltage and current to supply one or more load devices. In such examples, to provide for communication over the power line 650, the multiplexer modules 610, 615 may each be equipped with frequency selective receivers that can detect demodulate command signals that are modulated on top of the power line power delivering signal, which may be low voltage DC, for example, or 60 Hz AC, for example, as carried on the command wire 650. In various examples, a suitable frequency selective receiver may include an analog filter, a digital filter implemented in hardware, a digital filter implemented in software, or a combination of these, to selectively detect and extract a modulated command signal on the carrier power signal. Various modulation schemes may be used, including but not limited to phase, frequency, or amplitude modulation.

Each multiplexer 610, 615 may be assigned a predetermined unique address for selectively determining which signal commands to react to. For example, the first multiplexer 610 may have address 0001 and the second multiplexer 615 may have address 0002. Further, each channel wire 655, 660, 665 may have a distinct address, such as "A", "B", and "C" for example. In an exemplary embodiment, the main controller 605 may send a serial command signal along the command wire 650, such as 0001A0002B for example. The command signal may be interpreted by the multiplexer 0001 illustrated as the first multiplexer 610 to read channel wire "A" illustrated as wire 655 and transmit the respective command signal on wire "A" to the connected light emitting devices since address "A" follows the address of the first multiplexer 610. Since channel address "B" follows the multiplexer address 0002 illustrated as multiplexer 615, the second multiplexer 615 may be programmed to read channel wire "B" illustrated as wire 660 and transmit the respective electrical signal carried on channel wire "B" to the connected light emitting devices. Accordingly, some embodiments of a control scheme may dynamically control the routing of signals on any of wires 655-665 to any selected load, such as the loads connected to any selected one of the radial receptacles 620, 630. Such control schemes may be implemented by operation of a controller, an example of which is described with reference to FIG. 5.

If a manual or automatic preferred channel change were made to one or more of the multiplexer 610, 615 or main controller 605, the main controller 605 may be configured to send out an electrical command signal referencing only the multiplexer 610, 615 that was changed. For example, if the second multiplexer 610 were changed to read and transmit channel "C" illustrated by wire 665 via a control switch or other adjustment device, the main controller 605 may transmit an electrical command signal having data 0002C. Since the electrical command signal does not reference multiplexer 0001, the first multiplexer 610 ignores the command and the command is only read and acted upon by the second multiplexer 615 addressed 0002.

Various embodiments include exemplary addressing schemes that may be illustrative of the flexible configurations achievable with a multi-channel system with signal distribution in a trunk signals.

In some implementations, information and/or command signals may be conveyed axially via an optical path. In some examples, information and/or command signals may be coupled between trunk segments using galvanically-isolated electrical ports, for example, formed of magnetic flux coupling (e.g., transformer coupling), capacitive coupling, optical coupling, either alone or in some combination.

Figure 7A:
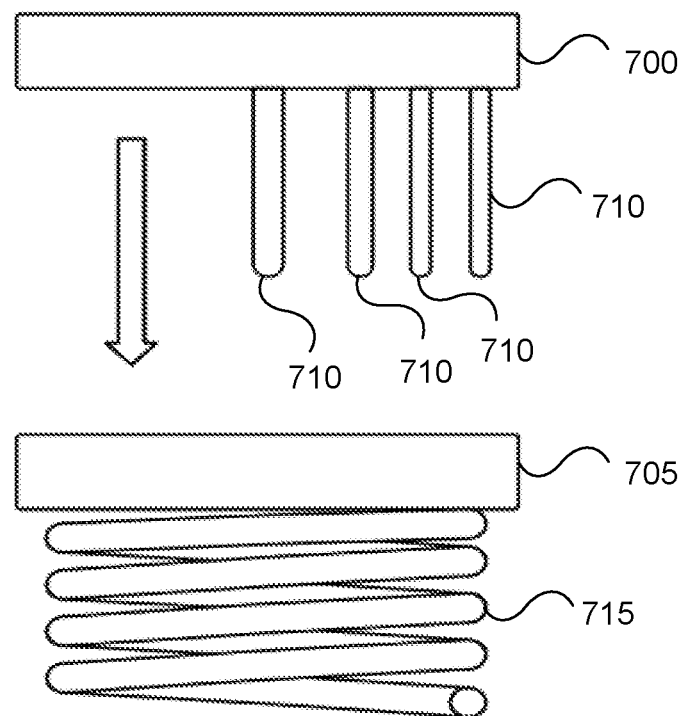
FIGS. 7A-7B depict an exemplary orientation-independent multi-channel signal interface connection assembly.
Figure 7B:
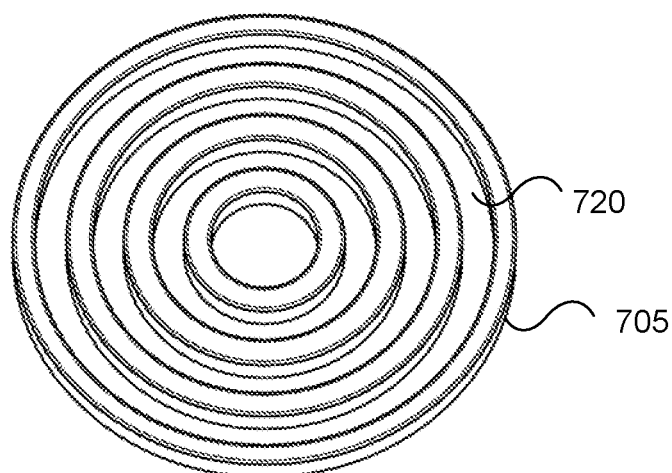

FIGS. 7A-7B depict an exemplary orientation-independent multi-channel signal interface connection assembly. A connection assembly includes a first connector 700 and a second connector 705. The first connector 700 and the second connector 705 may be formed integrally with the trunk segments and/or the branch segments as described herein to permit connection of trunk segments and/or branch segments in any radial orientation relative to each other. Also shown are a series of first electrical connectors 710 extending from the first connector 700 and a second electrical connector 715 formed within the second connector segment 705. The first electrical connectors 710 may be formed of a male-plug type and the second electrical connector 715 may be formed of a female plug type. In some embodiments, the connectors 710 may be spring-based pins that can adjust to small imperfections in the depth of the coupling connection to between the connector 705 and the connector 715.

The second electrical connector 715 may include an electrically conductive medium 720 for electrically receiving the first electrical connectors 710 and permitting the first electrical connectors 710 to be received within the second electrical connector 715 in any radial orientation. As seen in the top view of the connector 705 shown in FIG. 7B, axially symmetric concentric conductive rings 720 are separated by axially-symmetric concentric non-conductive separator rings. In making an electrical mating, a distal tip of each of the connectors 710 fits within or between adjacent separator rings to substantially prevent electrical shorting.

In some embodiments, the conductive rings 720 may be formed of a conductive gel substance, or a conductive metal (e.g., by way of example and not limitation, copper, nickel, brass, gold or a combination thereof). In some embodiments, each first electrical connector 710 may transmit a different electrical signal.

FIGS. 8A-8C depict another exemplary orientation-independent multi-channel signal interface connection assembly. FIG. 8A depicts an exemplary first connector 800. FIG. 8B and FIG. 8C depict an exemplary sectional view and an exemplary upper perspective view of a second connector 805. The first connector segment 800 and the second connector segment 805 may be formed integrally with the trunk segments and/or the branch segments, respectively, as described herein to permit connection of trunk segments and/or branch segments in any radial orientation relative each other. Also shown are a series of first electrical connectors 810 extending from the first connector segment 800 and a second electrical connector 815 formed within the second connector segment 805. The first electrical connectors 810 may be formed of a male-plug type and the second electrical connector 815 may be formed of a female plug type.

The second electrical connector 815 may include an electrically conductive medium 820 for electrically receiving the first electrical connectors 810 and permitting the first electrical connectors 810 to be received within the second electrical connector 815 in any radial orientation. In some embodiments, the conductive medium 820 may be formed of a conductive gel substance. In some embodiments, each first electrical connector 810 may transmit a different electrical signal (e.g., power, commands, information), such as a different signal channel.

Figure 9A:
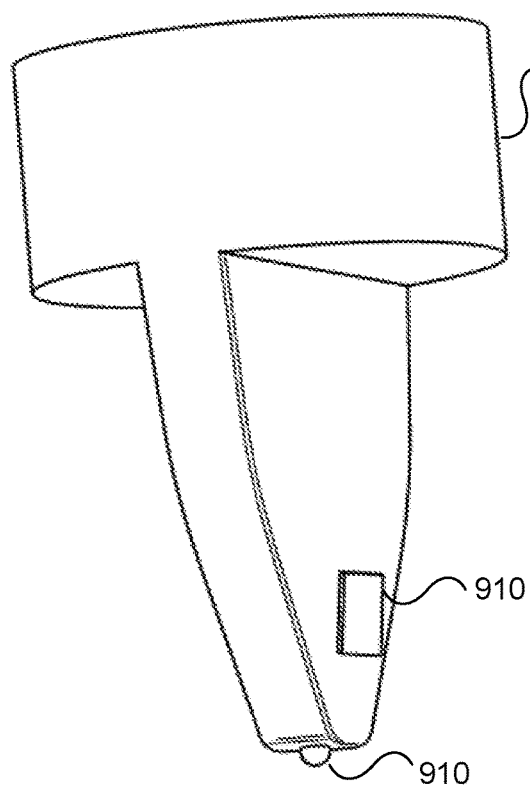
FIGS. 9A, 9B, 9C, and 9D depict an exemplary self-aligning multi-channel signal interface connection assembly.
Figure 9B:
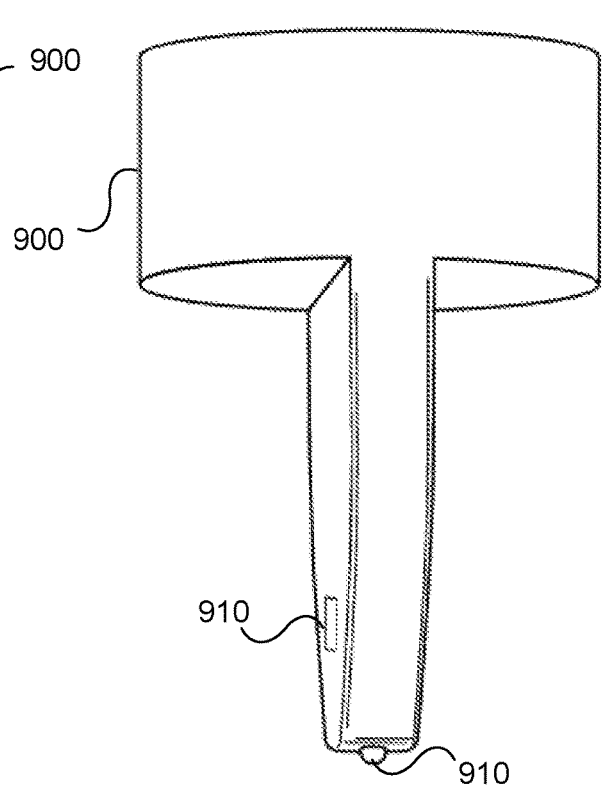
Figure 9C:
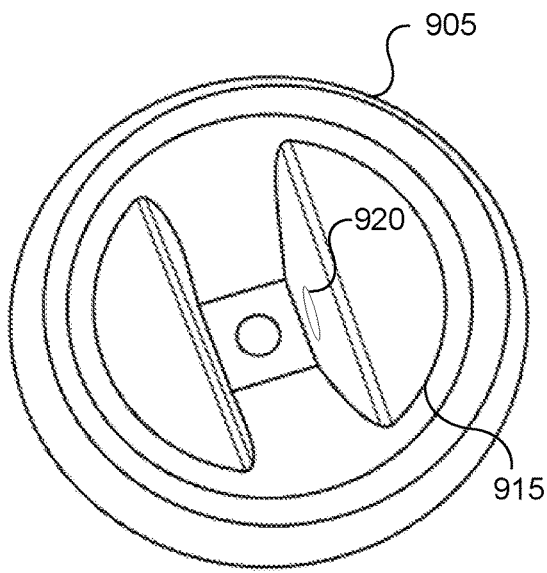
Figure 9D:
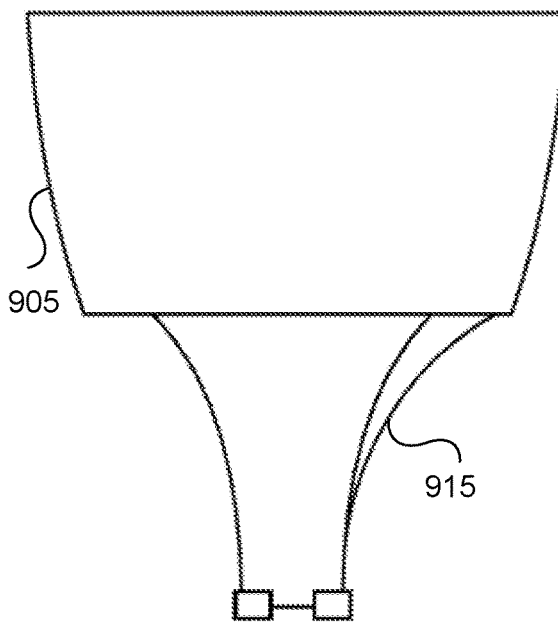

FIGS. 9A-9D depict an exemplary self-aligning multi-channel signal interface connection assembly. FIG. 9A and FIG. 9B depict an exemplary first connector 900 in plan and perspective side views. FIG. 9C and FIG. 9D depict an exemplary top view and an exemplary sectional view of a second connector 905. The first connector segment 900 and the second connector segment 905 may be formed integrally within the trunk segments and/or the branch segments as described herein to permit connection of trunk segments and/or branch segments in a self-aligning manner. Also shown are a series of first electrical connectors 910 extending from the first connector segment 900 and a guide 915 leading to a series of second electrical connectors 920 formed within the second connector segment 905. The first electrical connectors 910 may be formed of a male-plug type and the second electrical connector 920 may be formed of a female plug type.

The guide 915 forces the male end of the first connector segment 900 to be rotated towards a pre-determined angle with respect to a longitudinal axis when being inserted within the second connector segment 905. The guide 915 has curved or angled interior edges so that the first connector segment 900 slides into the second connector segment 905 smoothly and without obstruction. The second electrical connector 920 may comprise an electrically conductive medium 920 for electrically receiving the first electrical connectors 910 and permitting the first electrical connectors 910 to be received within the second electrical connector 920. In some embodiments, the conductive medium 920 may be a conductive gel substance. In some embodiments, each first electrical connector 910 may transmit a different electrical signal.

Figure 10A:
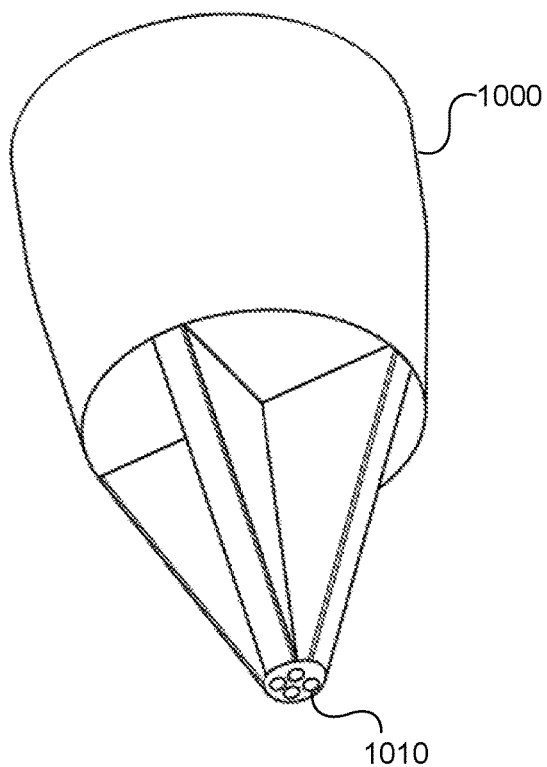
FIGS. 10A, 10B, 10C, and 10D depict another exemplary self-aligning multi-channel signal interface connection assembly.
Figure 10B:
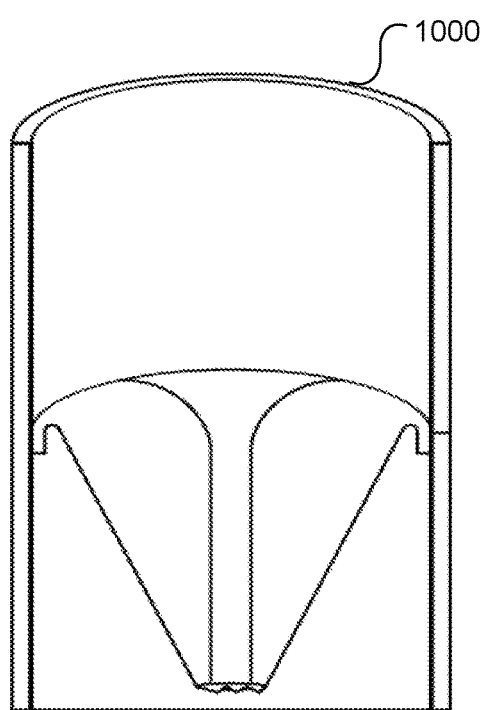
Figure 10C:
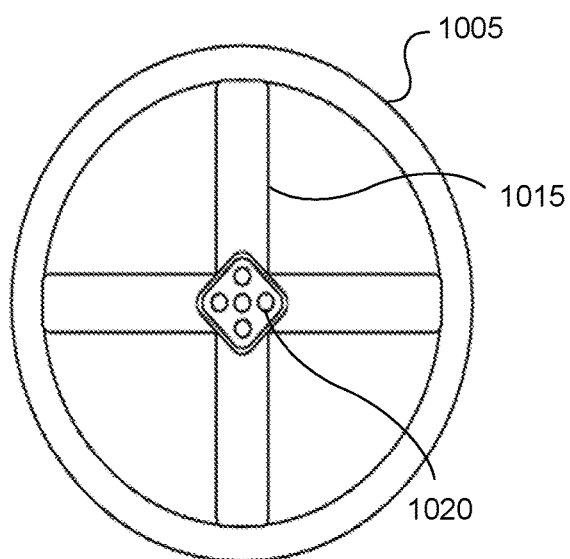
Figure 10D:
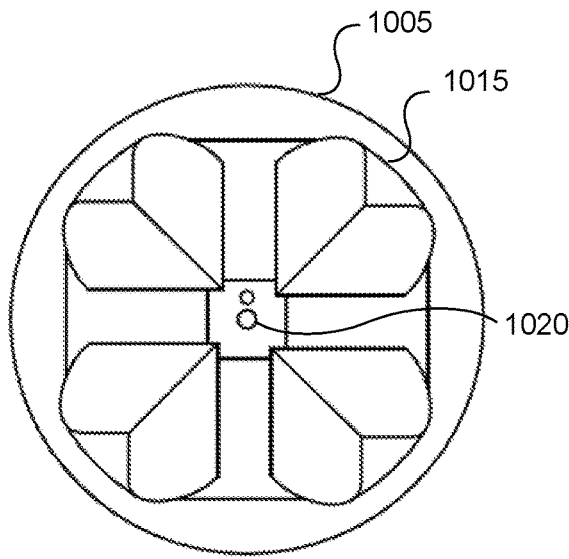

FIGS. 10A-10D depict another exemplary self-aligning multi-channel signal interface connection assembly. FIG. 10A and FIG. 10B depict an exemplary first connector 1000 in a side perspective view and a sectional view. FIG. 10C and FIG. 10D depict an exemplary bottom view and an exemplary top view of a second connector 1005. The first connector segment 1000 and the second connector segment 1005 may be formed integrally with the trunk segments and/or the branch segments as described herein to permit connection of trunk segments and/or branch segments in a self-aligning manner. Also shown are a series of first electrical connectors 1010 extending from the first connector segment 1000 and a guide 1015 leading to a series of second electrical connectors 1020 formed within the second connector segment 1005. The first electrical connectors 1010 may be formed of a male-plug type and the second electrical connector 1020 may be formed of a female plug type.

The guide 1015 forces the male end of the first connector segment 1000 to be rotated towards a pre-determined rotation when being inserted within the second connector segment 1005. The guide 1015 has curved or angled interior edges so that the first connector segment 1000 slides into the second connector segment 1005 smoothly and without obstruction. The second electrical connector 1020 may comprise an electrically conductive medium 1020 within for electrically receiving the first electrical connectors 1010 and permitting the first electrical connectors 1010 to be received within the second electrical connector 1020. In some embodiments, the conductive medium 1020 may be a conductive gel substance. In some embodiments, each first electrical connector 1010 may transmit a different electrical signal.

Figure 11:
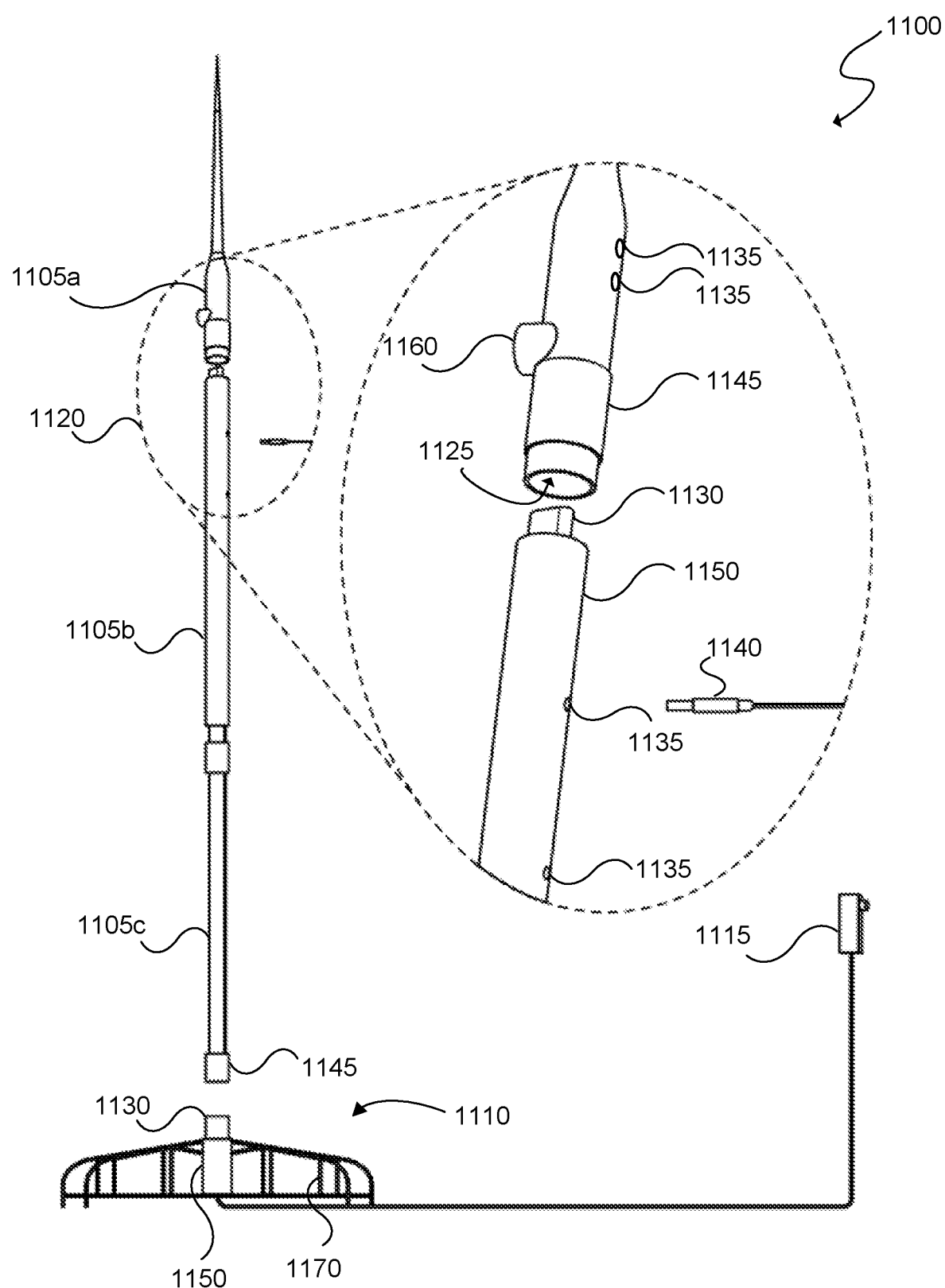
FIG. 11 depicts an exemplary multichannel distribution system integrated in a central pole.

FIG. 11 depicts an exemplary multichannel distribution system integrated in a central pole. As depicted, a multi-channel distribution system 1100 includes pole sections 1105 A, B, C, through which multichannel signal conductors are routed from a base 1110. Extending from the base 1110 is a signal conductor coupled to an interface 1115. The signal conductor between the base 1110 and the interface 1115 may conduct, for example, power and/or one or more channels of information signals.

The pole section 1105a, couples to the pole section 1105b via an interface 1120, which is shown in the magnified view to reveal additional details. Similarly, the pole sections 1105 B couples to the pole section 1105 C, and the pole section 1105 C couples to the base 1110 via interfaces substantially similar to the interface 1120.

In the magnified view of the interface 1120, the interface 1120 includes a multi-channel socket 1125 to receive and provide signal communication to corresponding channels in a plug 1130. When mated, the multi-channel signals may communicate to radial ports 1135 distributed along the length of the pole sections 1105 A-C. The radio port 1135 is depicted in this example as receiving a radial plug assembly 1140, which may be connected to a load and/or a single or multi-channel signal source.

In the depicted example, adjacent pole sections may be securely coupled by a collar 1145 engaging threads 1150. Also in the depicted example the pole section 1105 A includes an output connector 1160 at which some or all of the multichannel signals may be made available to an external load device and/or a controller. In various embodiments, one or more of the output connectors 1160 may be made available, for example, within the base 1110 and/or any of the other pole sections 1105.

Figure 12:
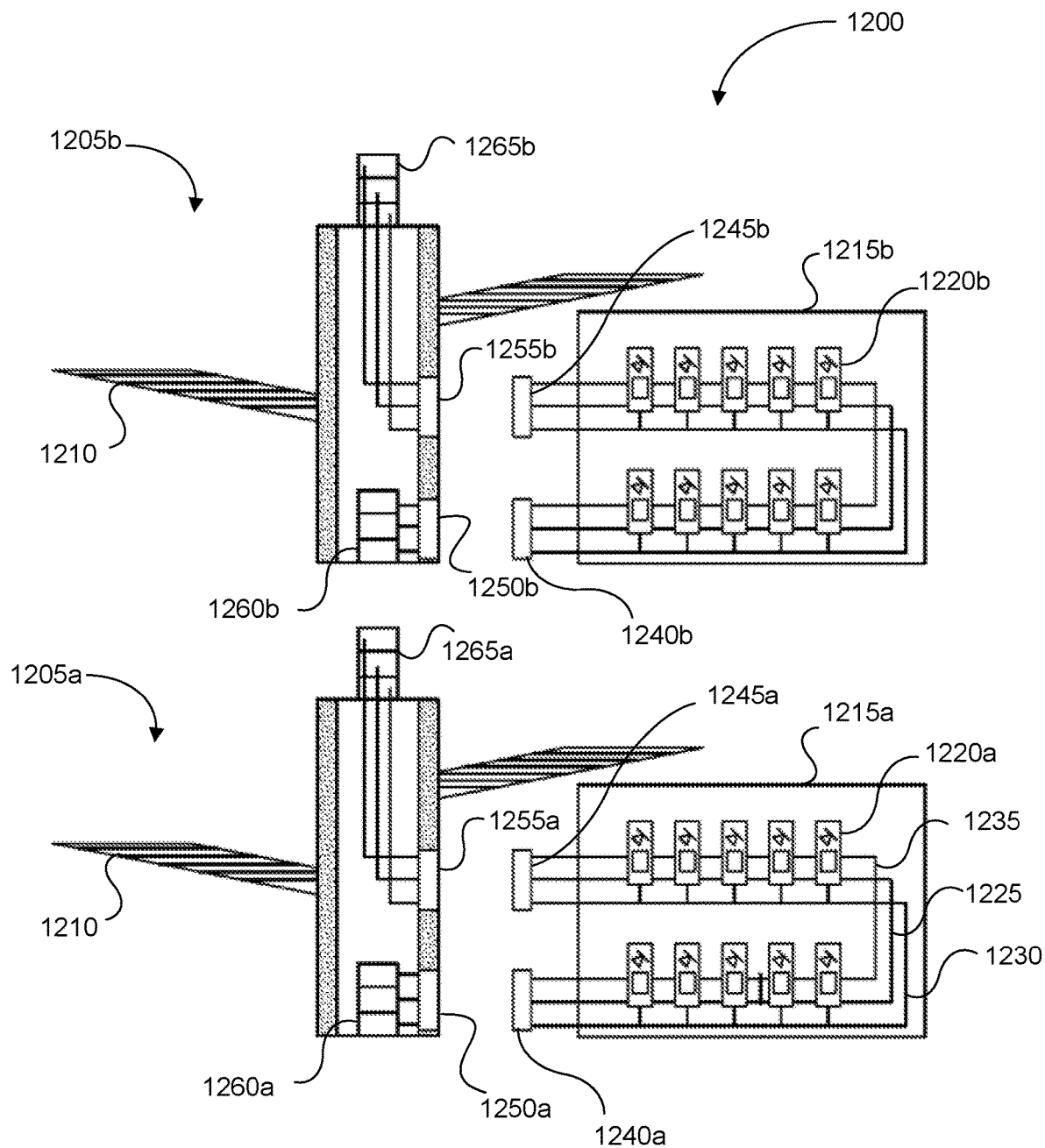
FIGS. 12, 13, 14, 15, and 16 depict schematically exemplary trunk segment configurations for distributing operating power and serial control commands to individual light string elements.
Figure 13:
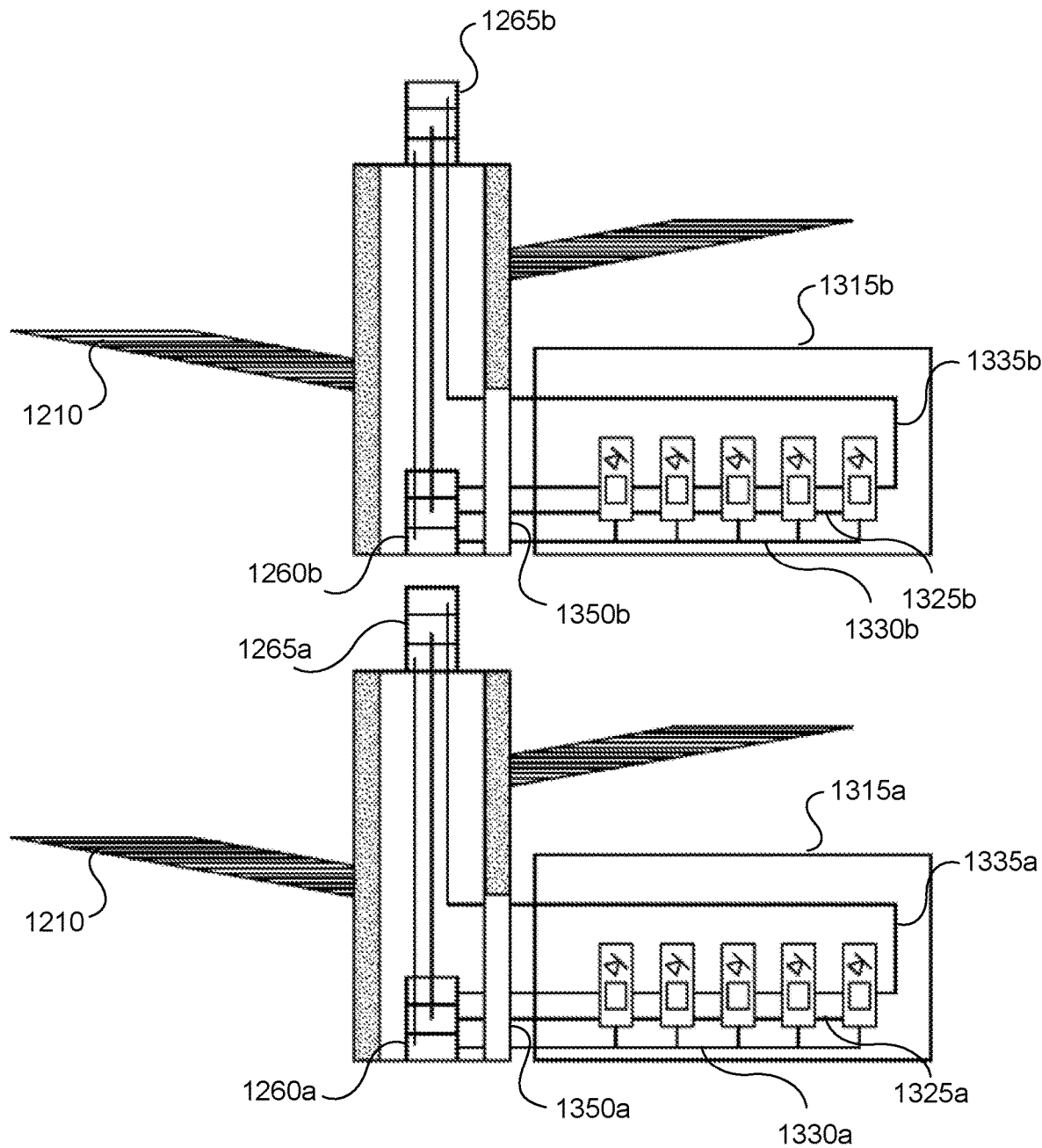
Figure 14:
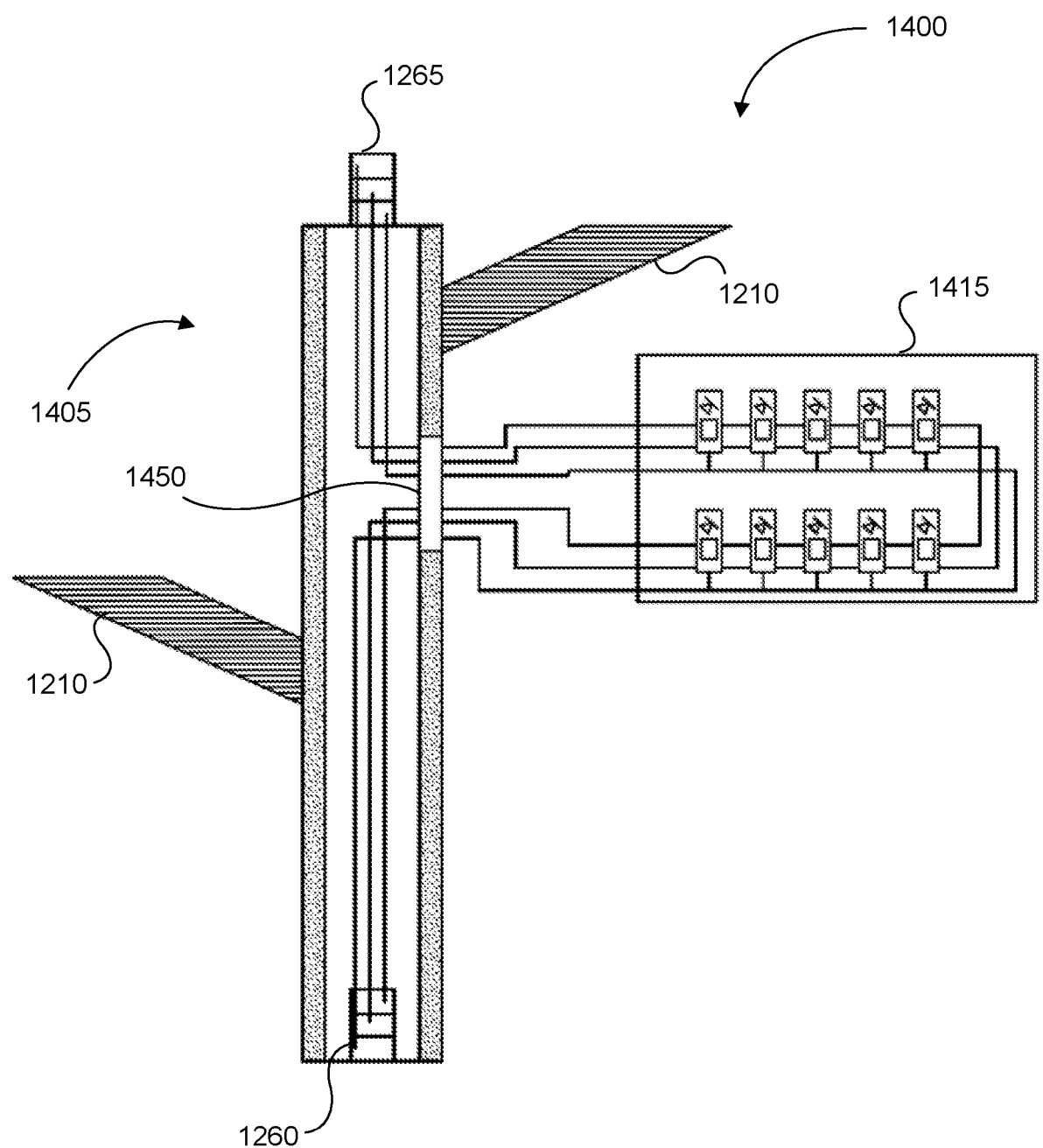
Figure 15:
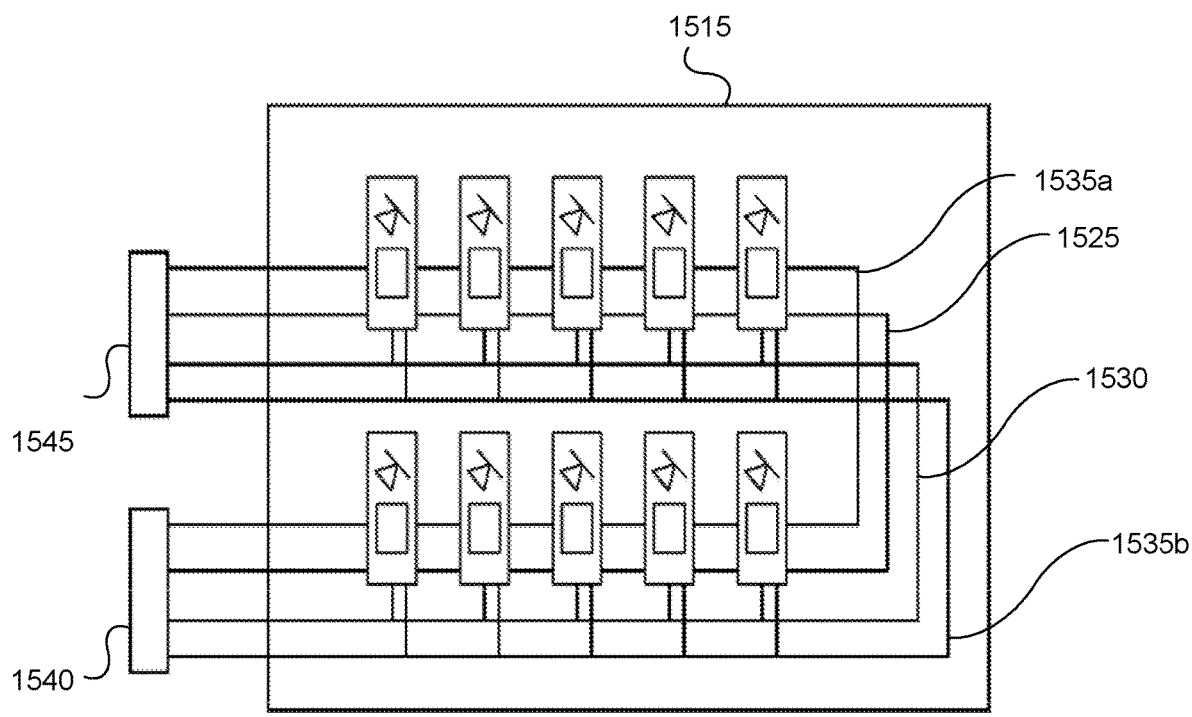
Figure 16:
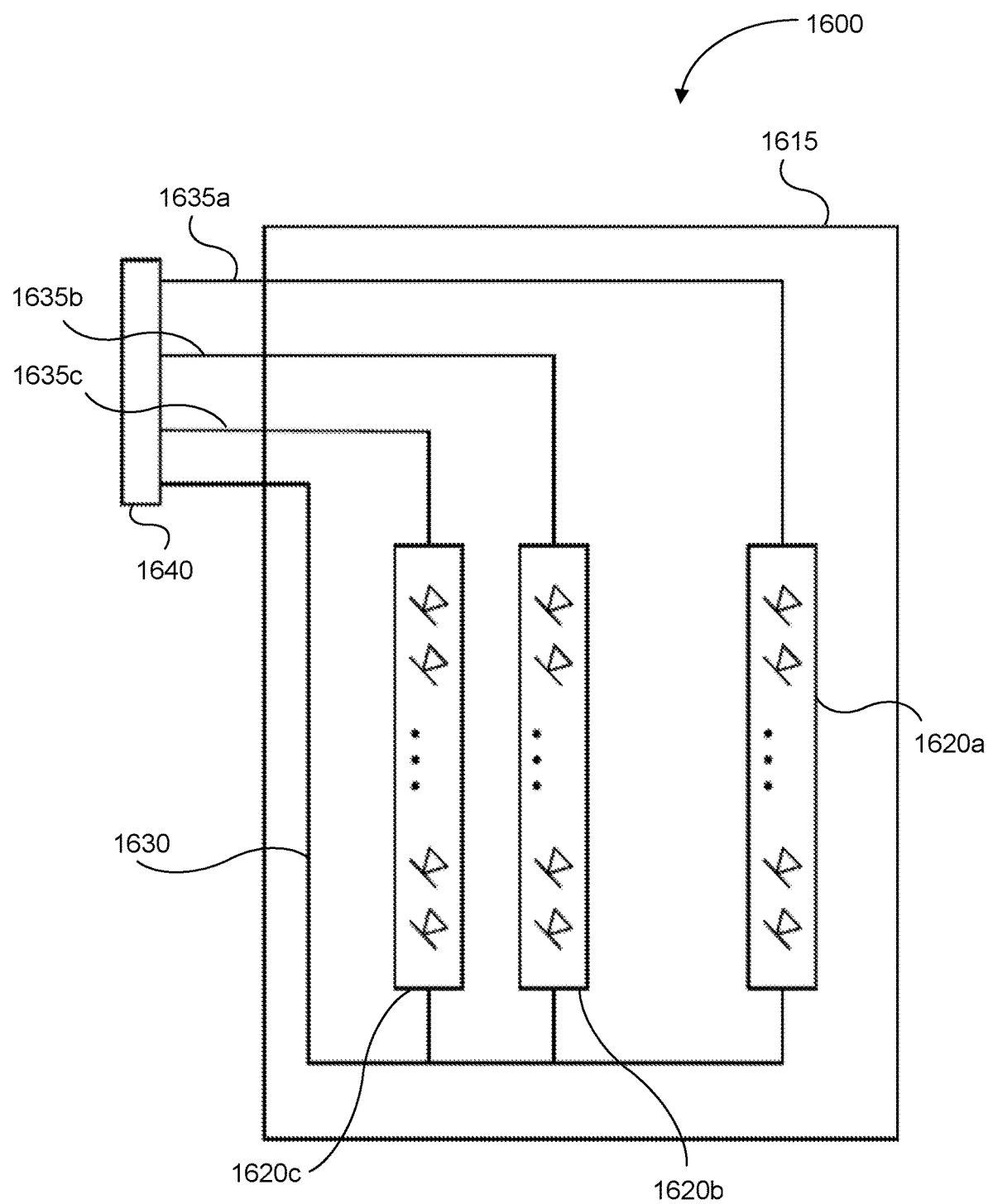

FIGS. 12-16 depict schematically exemplary trunk segment configurations for distributing operating power and serial and/or parallel control commands to individual light string elements. To illustrate exemplary embodiments for communicating operating power, return, and command signals through a trunk segment, FIG. 12 depicts a light string with power, return, and data lines extending between two opposing connectors for releasably plugging into a trunk segment to form a loop that can be distributed on the branches of the tree, for example. FIG. 13 depicts an end-in-bulb light string with power, return, and data lines exiting via an aperture in each trunk segment, with the data signal looping back to re-enter the trunk segment through the same aperture. FIG. 14 depicts an embodiment similar to that of FIG. 12, but the ends of the light string are integrally connected inside the trunk segment rather than pluggably connected, both ends of the light string enter and exit the trunk segment through a common aperture, for example. FIG. 15 depicts a light string similar to the one of FIG. 12, with the addition of an additional control line (e.g., clock signal) that is distributed to each individually addressable illumination module, so as to accommodate serial data systems that require a clock input signal. FIG. 16 depicts a light string with at least 3 parallel current paths independently driven by an independent command signal.

In FIG. 12, an artificial tree apparatus 1200 includes first and second trunk segments 1205a, 1205b, which may be connectable, for example, when aligned in an orientation independent manner along a longitudinal axis (e.g., vertical axis). The trunk segments 1205a,b are adorned with radially extending branches 1210 at various locations along each of the segments. The artificial tree apparatus 1200 is illuminated with decorative light string assemblies 1215a, 1215b, associated with the trunk segments 1205a, 1205b, respectively.

Each of the light string assemblies 1215a,b includes a number of individually operable illumination modules 1220*a*, 1220*b*. Each of the illumination modules 1220*a,b* in this example is an individually addressable light engine, responsive to an independent, serially-addressed command signal targeting that individual illumination module 1220*a,b*. In some examples, at least some of the individual illumination modules 1220*a,b* may include a cascadable LED driver chip, such as the WS2811, commercially available from Worldsemi Co., Limited of China. In various examples, the LED driver chip may be addressable, and send and receive serial commands from and to adjacent illumination modules 1220*a,b* along either of the light assemblies 1215*a,b*. Each such driver chip may control illumination of one or more luminaires, such as a red, green, or blue (RGB), for example, in the illumination module 1220*a,b* in response to a received serial command signal. In the depicted figure, the illumination modules 1220*a,b* each receive an operating power signal 1225, a circuit return 1230 (e.g., ground, or circuit reference potential), and a command signal 1235. In various embodiments, the command signal 1235 may be a single wire configured to distribute a serial command signal, or 2 or more wires to provide command signals in the form of data, control, and/or clock signals, for example.

The light string assemblies 1235*a,b* extend between connectors 1240*a,b* and 1245*a,b*, respectively. The connectors 1240*a,b* and 1245*a,b* are releasably pluggable to make electrical connection to respective trunk segment connectors 1250*a,b* and 1255*a,b*. When so connected, the light string assembly 1215*a,b* may provide an electrical channel for a female trunk segment connector 1260*a,b* to transmit operating power 1225, the circuit return 1230, and serially addressable command signals 1235 to a male trunk segment connector 1265*a,b* at an opposite end of the trunk segment 1205*a,b*. When the male trunk segment connector 1265*a* of the first trunk segment 1205*a* is in engagement with the female trunk segment connector 1260*b* of the second trunk segment 1205*b*, then the operating power 1225, the circuit return 1230 and the command signal 1235 may be routed from the female trunk segment connector 1260*a* of the first segment, through the lights string assemblies 1215*a,b*, and to the male trunk segment connector 1265*b* of the second trunk segment 1205*b*. From there, one or more subsequent trunk segments (not shown) may be connected, and the operating power 1225, the circuit return 1230 and the command signal 1235 may be routed via the trunk segments and made available to operate additional loads, such as downstream light strings, controllers, and/or other loads.

In various embodiments, a number of the branches 1210 may be distributed at numerous locations around the trunk segments 1205*a,b*. There may be more than one light string assembly in each trunk segment 1205*a,b*. The connectors 1260*a,b* and 1265*a,b* may be, for example, self-aligning, examples of which are described with reference to FIGS. 7A-10D.

FIG. 13 depicts an end-in-bulb light string 1315*a,b* with power 1325*a,b*, circuit return 1330*a,b*, and data 1335*a,b* lines exiting via an aperture in each trunk segment, with the data 1335*a,b* line looping back to re-enter the trunk segment through the same aperture 1350*a,b*. An internal connection from the power and circuit return may extend directly between the female trunk segment connector 1260*a,b* and the male trunk segment connector 1265*a,b*. The data line 1335*a,b* passes serially through the light string 1315*a,b*, respectively.

A serial command signal transmitted by the controller (not shown) over the serial data line 1335*a,b* may include a first signal addressed to be received and accepted by one or more of the individual light illumination modules in the light string 1315*a*, while a second signal in that same serial command may be received and accepted by one or more of the individual light illumination modules in the light string 1315*a*. The second signal may be independent from the first signal. The first and second light strings 1315*a,b* may execute the first and second signals substantially simultaneously in response to the same serial command signal.

FIG. 14 depicts an embodiment similar to that of FIG. 12, except the ends of the light string 1415 are integrally connected inside the trunk segment 1405 rather than pluggably connected. Both ends of the light string 1415 enter and exit the trunk segment through a common aperture, for example.

FIG. 15 depicts a light string 1515 similar to the one of FIG. 12, with the addition of an additional control line (e.g., clock signal 1535*b*) that is distributed to each individually addressable illumination module, so as to accommodate serial data systems that operate synchronously, or with a clock input signal, in coordination with a serial data signal 1535*a*. In this example, the power 1525, circuit return 1530, the data 1535*a*, and clock 1535*b* extend between two opposing end connectors 1540 and 1545. If the connector 1540 is plugged in to the trunk segment (not shown), the connector 1545 is available to supply the power 1525, circuit return 1530, the data 1535*a*, and clock 1535*b* to operate downstream loads, such as light strings, controllers, splitters, and peripheral loads, for example.

FIG. 16 depicts a light string with at least 3 parallel current paths independently driven by an independent command signal. FIG. 16 depicts an exemplary light string 1615 with parallel circuits 1620*a,b,c* driven respectively by, in this example, three independent command signals 1635*a,b,c* that merge at a common return path 1630. Each of the circuits 1620*a,b,c* may have a unique color scheme and/or spatial distribution, for example, to provide for lighting effects. One or more of the lighting elements in any of the circuits 1620*a,b,c* may be individually addressable by, for example, serial commands supplied on the corresponding command signals 1635*a,b,c*.

In some embodiments, a light string, such as various ones of the light strings described with reference to FIGS. 12-16, for example, may include a pass-through channel for operating power to be distributed from a connector at one end to a connector at an opposite end of the light string. Such pass through of operating power may advantageously deliver power to at least one downstream controller and/or peripheral device(s), for example, that may be connected to at least one subsequent light string or device. Some examples of light strings may include command signals in addition to pass through power, and may be adapted for connection to receive operating power and command signals from the inside one of the trunk segments. Some examples that can be so configured are described with reference, for example, at least to FIG. 13 of U.S. patent application Ser. No. 14/796,950, entitled "Low Voltage Coupling," filed by Long, et al. on Jul. 10, 2015, the entire contents of which are incorporated herein by reference.

In various implementations, operating power levels may be at or beyond a maximum efficiency operating point, or a stable operating point (e.g., voltage out of range). In order to expand compatibility and length capacity, some embodiments may further include a level shifting module in cascade-connected light strings, for example. Some examples that can be so configured are described with reference, for example, at least to FIGS. 1-3 of U.S. patent application Ser. No. 14/576,661, entitled "Modular Light String System Having Independently Addressable Lighting Elements,"

filed by Loomis, et al. on Dec. 19, 2014, the entire contents of which are incorporated herein by reference.

Although various embodiments have been described with reference to the Figures, other embodiments are possible. For example, the axial electrical connectors may be configured in other structural shapes. A first axial electrical connector may be configured in the shape of a concentric ring extending along an outside of a first trunk segment and beyond an end of the first trunk segment. A corresponding end of a second trunk segment may include an axial electrical connector formed into the end for being received by the first axial electrical connector in an overlapping manner.

In an exemplary embodiment, each branch segment may be attached separately to the trunk segments during assembly of the artificial tree apparatus in some exemplary embodiments. In other exemplary embodiments, one or more of the branch segments may be pre-attached to the trunk segments to lessen assembly time of the artificial tree apparatus. In some exemplary embodiments, the branch segments may be pivotally attached to the trunk segments such that the branch segments are folded up during storage to minimize an overall surface area of the artificial tree apparatus and during assembly the branch segments folded downwards to mimic a tree.

The branch segments may be configured in various lengths. The branch segments may be colored to match living trees or may incorporate other nontraditional colors, such as for example red, pink, blue, or white.

In accordance with another embodiment, each light emitting device may emit a pre-determined light pattern. For example, each light emitting device in a branch segment may blink at a given rate, remain constant, or gain/loss intensity. In other exemplary embodiments, some lighting devices on a branch segment may perform a first function while other lighting devices on the same branch segment may perform a second function, either simultaneously or at different times. For example, a first lighting device may blink while a second lighting device may remain constant on, while a third lighting device may increase/decrease light intensity only when the first and second lighting devices remain off. In other exemplary embodiments, a group of light emitting devices may collaborate together to emit the pre-determined light pattern. For example, the light emitting devices may emit different patterns to follow a beat to a popular song.

In accordance with another embodiment, the control system may comprise a single controller or a multitude of controllers. For example, a single controller may be located at the base of the artificial tree apparatus to generate and transmit command signals to respective light emitting devices upon the branch segments. In other exemplary embodiments, each branch segment may include a slave controller and a master controller may be located proximate the base of the artificial tree apparatus. The slave controllers may be located within the respective branch segments or trunk segments, for example.

In accordance with an exemplary embodiment, the axial electrical connectors may include more than three contacts, such as 4, 5, 6, or 7 contacts for example, where each contact may be configured to carry an independent signal. In an exemplary embodiment, a first additional contact carries a first electrical command signal, a second additional contact carries a second electrical command signal and a third additional contact carries a third electrical command signal. For example, the first additional contact may carry an electrical command signal representative of a blinking light pattern, the second additional contact may carry an electrical command signal representative of an alternately fading/constant light pattern, and the third additional contact may carry an electrical command signal representative of a stepped light pattern. If a group of first lighting devices are configured to receive an electrical command signal from the first additional contact, the first lighting devices receive an electrical command signal representative of a blinking light pattern.

In accordance with an exemplary embodiment, the electrical command signal may include different types of data pertaining to illumination. For example, the command signals may include data pertaining to a light pattern. In other examples, the command signals may include data pertaining to a light intensity, such as brightness of an outputted light. In other examples, the command signals may include data pertaining to a light color. In some examples, the electrical command signal may include different types of data pertaining to sound. For example, the command signal may include data pertaining to a song or a musical note. In an exemplary embodiment, some trunk segments or branch segments may include speakers for outputting a sound received by the electrical command signal.

In various embodiments, apparatus and methods may involve a controller having a voice activated light controller. A command signal may be generated based upon a voice command given to the controller. For example, a user may speak the words "blinking red channel 1," and the controller would interpret the voice command, generate, and transmit an electrical command signal along channel 1 wire that causes the light emitting devices to output a red colored blinking pattern. In some embodiments, a tangible on/off switch may be incorporated into the controller and/or light emitting devices. For example, the user may turn the light emitting devices on and off via a special touch sensor ornament (e.g., a metal snowflake) that is permanently attached to the artificial tree apparatus.

In various embodiments, signal and power carrying wires may be strung internally through the trunk segments such that there will be no visibility of the signal and power carrying wires from an outside of the trunk segments. In some embodiments, wireless transmission may be used to communicate a command signal to one or more light emitting devices. In other embodiments, a wireless transmission may be used to communicate a command signal to a receiver local to the respective branch segment, where the branch segment then directs the command signal to the light emitting devices upon the respective branch segment via wired or wireless transmission.

In various embodiments, an electric motor may be incorporated into the base of the artificial tree apparatus to cause the artificial tree apparatus to rotate. In some implementations, a wireless remote control permits the user to turn the light emitting devices on and off, as well as turn the motor on and off. The motor may be connected to the base, such as for example to the top of the base through a plug and socket arrangement.

In accordance with an exemplary embodiment, a control system may generate a plurality of electrical command signals each intended for a specific group of light emitting devices on a singular branch segment or singular trunk segment. For example, a first trunk segment may be configured to receive a first electrical command signal representative of a red blinking pattern. The red blinking pattern may be transmitted to each of the light emitting devices directly connected to the first trunk segment. In some examples, a second trunk segment may be configured to receive a second electrical command signal generated by the control system and representative of a blue constant on pattern. The blue constant on pattern may be transmitted to each of the light emitting devices directly connected to the second trunk segment.

By way of example and not limitation, load devices may include motors, audio transducers, light emitting diodes or other light emitting devices, for example, either alone or in combinations. In some implementations, a user-controlled switch may be located upon each trunk segment for corresponding branch segments having load devices. In various implementations, a user-controlled switch may be located next to each branch segment such that each trunk segment may have a plurality of user-controlled multi-position switches, for example. In some examples, a specific command signal may be associated with a specific radial receptacle such that each branch segment may be plugged into a pre-determined radial receptacle determined by the illumination pattern and color intended for the light emitting devices connected to the branch segment.

In various examples, one or more branches may be associated with a load circuit. One or more of the load circuits may include a group of light emitting devices. In some implementations, each group of light emitting devices may be manually configured via one or more user-interfaces. In some implementations, adjoining trunk segments may couple via an axially-symmetric connection system that permits connection in any radial orientation relative to the longitudinal axis of the trunk or column. In some examples, the control system may output a plurality of (e.g., electrical, optical) command signals. Each command signal may be, in some embodiments, intended for and/or addressed to a specific predetermined load.

In some embodiments, a communication signal may be transmitted to the controller to command the controller to enter one of a plurality of user-selectable modes. Each mode may be associated with a corresponding illumination signal to be generated and transmitted to the light emitting devices. For example, a wireless transmission having a command for an illumination signal may be sent from a mobile device over a local or wide-area network to the controller. Upon receiving the command, the controller may then generate or relay the signal to the light emitting devices through the internal transmission wires within the trunk segments and along or through the branch segments.

In various embodiments, a multi-channel signals may include serial, multiplexed, and/or parallel techniques. For example, a single conductive path within the tree column may carry an operating current (e.g., power/return, bias supply, etc. . . . ) and, in combination, a time and/or frequency division or multiplexed command or information signal. Multi-channel signals used to control, for example, a plurality of independent load circuits, for example, may share a common conductive transmission path in addition to a common return path, for example. Multi-channel signals may include, by way of example, and not limitation, time-division multiplex, frequency division multiplex, space-division multiplex, amplitude modulation, frequency modulation, phase modulation, quadrature keying, and other known modulation techniques for encoding one or more independent signals. As such, for example, a power line carrier technique could be employed to control a plurality of independent loads with a two wire system that supplies operating current to all of the loads simultaneously.

In an illustrative example, a two wire system could provide power, return, and a modulated signal encoding a multiplexed n=4 bit (e.g., n may be about 2, 3, 4, 5, 6, 7, or at least about 8 or more) data stream that enables the controller to directly address commands to any of 16 independently addressable loads via the tree column. Commands to be performed at the load device can be formatted in 4 bit chunks to be received by the addressed decoder.

In some implementations, voltage level output from a power supply controlled by the controller may encode a command or information signal that can be detected using level detection circuits, which may be distributed in one or more multiplexer modules or signal routers, for example.

Multi-channel signals may include electrical signals conducted via the tree column. In certain embodiments, multi-channel signals may also include signals or combinations of signals conveyed in various forms via the tree column. By way of example and not limitation, the tree column may convey commands, power, or other information signals via pneumatic, optical (e.g., light, infrared, UV, laser), fiber optic, mechanical (e.g., vibrational, push-rods), magnetic states, electrochemical mechanisms. Signal handling systems within the trunk may include signal transport (e.g., fiber optic, conductor, semiconductor), signal processing (e.g., optical filtering, electromagnetic reflectors, addressable decoders), switching apparatus (e.g., multiplexers, decoders, magnetic switches, hall effect switches, semiconductor switches, logic gates, etc. . . . ), and interface apparatus (e.g., transducers, interconnects, transformers, optocouplers, manifolds, etc. . . . ).

With reference to the example depicted in FIG. 2, in some embodiments, the first axial electrical connector 215 may not be recessed within the first trunk segment 200 and the inter-segment coupling of the trunk segments 200, 205 could be made solely by electrical connectors.

Although various examples have been described with reference to decorative plants, other implementations are possible. By way of example and not limitation, a plurality of power, command, and/or information signals may be communicated via signal paths disposed within a central pole member, for example, in a household floor lamp. Various advantages may accrue to such products, for example, in easy of manufacture, high performance capability, and/or improved electrical safety.

In one exemplary aspect, an artificial tree apparatus may include a first trunk segment having a first axial electrical connector, and a second trunk segment having a second axial electrical connector. The second axial electrical connector is adapted to longitudinally align and connect with the first axial electrical connector in a non-radial dependent manner. The apparatus further includes a first branch segment having a first light string replaceably disposable about the first branch segment. The first branch segment radially extends from the first trunk segment. A second branch segment has a second light string replaceably disposable about the second branch segment. The second branch segment radially extends from the second trunk segment. A control system is configured to generate a first electrical command signal and a second electrical command signal. Operating power for the first and second light strings and the first and the second electrical command signals are transmitted from the first trunk segment to the second trunk segment through connection of the first and second axial electrical connectors. The first light string is configured to receive the first electrical command signal and the second light string is configured to receive the second electrical command signal.

In some embodiments of the artificial tree apparatus, the first electrical command signal may correspond to a first light pattern and the second electrical command signal may correspond to a second light pattern. The first light pattern may be different from the second light pattern. The first light pattern may include a first light color and the second light pattern may include a second light color. The first light pattern may include a visually perceptible visual light effect. The control system may include at least one user interface for altering the first electrical command signal or the second electrical command signal.

The artificial tree apparatus may include a first user interface and a second user interface. The first user interface may be adapted for operative route selection of the first electrical command signal or the second electrical command signal to the first light string. The second user interface may be adapted for operative route selection of the first electrical command signal or the second electrical command signal to the second light string. The first user interface may be located upon the first trunk segment and the second user interface may be located upon the second trunk segment. The first light string may be comprised of a first LED light string and the second light string may be comprised of a second LED light string. The apparatus may further include a plurality of channel wires extending within the first trunk segment and the second trunk segment from the control system for transmitting the first electrical command signal and the second electrical command signal. The control system may be configured to wirelessly receive user input signals from a mobile device. The control system may select a user-selectable mode in response to the wirelessly received user input signals.

In another exemplary aspect, an artificial tree apparatus may include a first trunk segment having a first axial electrical connector, and a second trunk segment having a second axial electrical connector. The second axial electrical connector may be adapted to longitudinally align and connect with the first axial electrical connector in a non-radial dependent manner. The apparatus further includes a first branch segment, wherein the first branch segment radially extends from the first trunk segment. A first light string is replaceably disposable about the first branch segment. A second branch segment radially extends from the second trunk segment. A second light string is replaceably disposable about the second branch segment. A current path in the first trunk segment connects to supply operating power to the first light string and to the first axial connector. At least one current path in the first trunk segment receives a first electrical command signal and a second electrical command signal from a control system. Operating power and the second electrical command signals are transmitted from the first trunk segment to the second trunk segment when the first and second axial electrical connectors are connected. The first light string is configurable to receive the first electrical command signal and the second light string is configurable to receive the second electrical command signal.

In various embodiments of the artificial tree apparatus, the first electrical command signal may correspond to a first light pattern. The second electrical command signal may correspond to a second light pattern. The first light pattern may be independent from the second light pattern. The first light string may be pluggably connectable to a first connector on the first trunk segment to receive the operating power and the first electrical command signal. The second light string may be pluggably connectable to a second connector on the second trunk segment to receive the operating power and the second electrical command signal.

The first electrical command signal and the second electrical command signal may be transmitted from the control system as a single serial data stream.

The control system may be configured to wirelessly receive user input signals from a mobile device. The control system may select a user-selectable mode in response to the wirelessly received user input signals. One or more of the user input signals may include an address associated with a specific one of the first and the second channels. The control system may be configured to receive the user input signals using a wireless communications protocol (e.g., Bluetooth, ZygBee).

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An artificial tree, comprising:
    a first tree section comprising:
        a first trunk portion,
        a first plurality of branches joined to the first trunk portion,
        a first electrical connector having four or more conductive terminals, the four or more conductive terminals including a first conductive terminal sharing a longitudinal axis with a second conductive terminal,
        a first light string having a first plurality of light-emitting diodes (LEDs), the first light string disposed on the first plurality of branches, and
        a first wiring system electrically connected to the first electrical connector and the first light string;
    a second tree section comprising:
        a second trunk portion,
        a second plurality of branches joined to the second trunk portion,
        a second electrical connector having a second plurality of conductive terminals, the second electrical connector configured to couple to the first electrical connector
        a second light string having a second plurality of LEDs, the second light string disposed on the second plurality of branches, and
        a second wiring system; and
    electronic circuitry in electrical connection with the first wiring system and the first electrical connector, the electronic circuitry configured to transmit power and control data to the first plurality of LEDs and the second plurality of LEDs via the first wiring system and configured to transmit power and the control data to the first electrical connector,
    wherein the first tree section is configured to couple to the second tree section such that the first electrical connector of the first tree section is in electrical connection with the second electrical connector of the second tree section, thereby mechanically and electrically connecting the first tree section to the second tree section such that the power and the control data are transmitted to the second tree section.

2. The artificial tree of claim 1, wherein the second plurality of conductive terminals of the second electrical connector comprises a third conductive terminal sharing a longitudinal axis with a fourth conductive terminal.

3. The artificial tree of claim 1 further comprising a single power cord configured to connect to an external power source and receive an input power, the single power cord in electrical connection with the first wiring system or the second wiring system.

4. The artificial tree of claim 3 further comprising a power adapter electrically connected to the single power cord and configured to output a direct-current (DC) output power, and wherein the first light string is electrically connected to the power adapter so as to receive the DC output power when the single power cord is connected to the external power source.

5. The artificial tree of claim 1, wherein the first plurality of LEDs includes LEDs of a first color and LEDs of a second color, and the control data determines whether the LEDs of the first color will be powered or the LEDs of the second color will be powered.

6. The artificial tree of claim 1, wherein the first wiring system includes a communication line connected to the electronic circuitry and is configured to transmit the control data to the first light string.

7. The artificial tree of claim 1 further comprising a power receptacle having two electrical receiver portions for receiving conductive terminals of a power plug, the receiver portions not in receipt of conductive terminals of a power plug of the first light string, the second light string, or another string of lights that is disposed on any branches of the artificial tree.

8. The artificial tree of claim 1, wherein the electronic circuitry includes a processor and is configured to cause the first plurality of LEDs to control a color of the first plurality of LEDs, and the first plurality of LEDs is capable of emitting light having a first color or a second color.

9. The artificial tree of claim 1, wherein the first plurality of LEDs includes a first group of LEDs and a second group of LEDs, and the electronic circuitry is configured to selectively power the first group of LEDs and the second group of LEDs such that one of the first group of LEDs and the second group of LEDs is powered off and the other of the first group of LEDs and the second group of LEDs is powered on.

10. The artificial tree of claim 1, wherein the first electrical connector and the second electrical connector are configured to transmit an alternating-current (AC) power and a direct-current (DC) power.

11. The artificial tree of claim 1 further comprising:
a third tree section comprising:
a third trunk portion,
a third electrical connector having a third plurality of conductive terminals,
a third wiring system, and
a third light string.

12. An artificial tree apparatus, comprising:
a first trunk segment having
a first axial electrical connector comprising a first direct-current (DC) socket, the first DC socket comprising a first plurality of conductive terminals that includes a first and a second conductive terminal sharing a longitudinal axis,
a first branch segment radially extending from the first trunk segment, the first branch segment having a first light string disposed thereon, and
a first DC connector interface disposed about the first trunk segment and configured to connect with the first light string;
a second trunk segment having
a second axial electrical connector comprising a second DC socket, the second DC socket comprising a second plurality of conductive terminals that includes a first and
a second conductive terminal sharing a longitudinal axis,
a second branch segment radially extending from the second trunk segment, the second branch segment having a second light string disposed thereon,
a third axial electrical connector comprising a third DC socket, the third DC socket comprising a third plurality of conductive terminals that includes a first and a second conductive terminal sharing a longitudinal axis, wherein the second and third axial electrical connectors are electrically connected through the second trunk segment, and
a second DC connector interface disposed about the second trunk segment and configured to connect with the second light string;
a third trunk segment having
a fourth axial electrical connector comprising a fourth DC socket, the fourth DC socket comprising a fourth plurality of conductive terminals that includes a first and a second conductive terminal sharing a longitudinal axis,
a third branch segment radially extending from the third trunk segment, the third branch segment having a third light string disposed thereon, and the third axial electrical connector sharing a longitudinal axis with the second axial electrical connector,
a third DC connector interface disposed about the third trunk segment and configured to connect with the third light string, and
an alternating current (AC) type plug disposed on the third trunk segment; and
electrical circuitry configured to provide operating power to the light strings and the axial connectors, wherein the operating power is transmitted from the first trunk segment to the second trunk segment when the first axial connector and the second axial connector are connected, and operating power is transmitted from the second trunk segment to the third trunk segment when the third axial connector and the fourth axial connector are connected.

13. The artificial tree apparatus of claim 12 further comprising second electrical circuitry disposed at least partially within the second trunk segment and configured to provide operating power to the second light string and the second and third axial electrical connectors.

14. The artificial tree apparatus of claim 12, wherein the first DC socket further comprises a second plurality of conductive terminals having a third and a fourth conductive terminal sharing a longitudinal axis.

15. The artificial tree apparatus of claim 12 further comprising a single power cord configured to connect to an external power source and receive an input power, the single power cord in electrical connection with the electrical circuitry.

16. The artificial tree apparatus of claim 12, wherein the first light string comprises a first plurality of light-emitting diodes (LEDs) including LEDs of a first color and LEDs of a second color.

17. An artificial tree comprising:
a first trunk segment having:
a first axial electrical connector comprising a first direct-current (DC) socket, the first DC socket comprising a first plurality of conductive terminals that includes a first and a second conductive terminal sharing a longitudinal axis,
a first branch segment radially extending from the first trunk segment, the first branch segment having a first light string disposed thereon,
a first DC connector interface disposed about the first trunk segment and configured to connect with the first light string, and
a first alignment mechanism;
a second trunk segment having
a second axial electrical connector comprising a second DC socket, the second DC socket comprising a second plurality of conductive terminals that includes a first and a second conductive terminal sharing a longitudinal axis,
a second branch segment radially extending from the second trunk segment, the second branch segment having a second light string disposed thereon,
a third axial electrical connector comprising a third DC socket, the third DC socket comprising a third plurality of conductive terminals that includes a first and a second conductive terminal sharing a longitudinal axis, wherein the second and third axial electrical connectors are electrically connected through the second trunk segment,
a second DC connector interface disposed about the second trunk segment and configured to connect with the second light string,
a second alignment mechanism, and
a third alignment mechanism;
a third trunk segment having
a fourth axial electrical connector comprising a fourth DC socket, the fourth DC socket comprising a fourth plurality of conductive terminals that includes a first and a second conductive terminal sharing a longitudinal axis,
a third branch segment radially extending from the third trunk segment, the third branch segment having a third light string disposed thereon, and the third axial electrical connector sharing a longitudinal axis with the second axial electrical connector,
a third DC connector interface disposed about the third trunk segment and configured to connect with the third light string, and
a fourth alignment mechanism;
electrical circuitry configured to provide operating power to the first light string and the first axial electrical connector, and
wherein the operating power is transmitted from the first trunk segment to the second trunk segment when the first axial electrical connector and the second axial electrical connector are connected, and operating power is transmitted from the second trunk segment to the third trunk segment when the third axial electrical connector and the fourth axial electrical connector are connected,
wherein the first alignment mechanism is configured to mate with the second alignment mechanism when the first trunk segment is mated with the second trunk segment and the third alignment mechanism is configured to mate with the fourth alignment mechanism when the second trunk segment is mated with the third trunk segment, and
wherein the electrical circuitry is housed in the second trunk segment and further configured to provide operating power to the second light string and between the second and third axial electrical connectors.

18. The artificial tree of claim 17, wherein the electrical circuitry is further configured to transmit a plurality of control signals to each of the first, second, and third light strings.

19. The artificial tree of claim 17, wherein one of the first, second, and third DC sockets further comprises a second plurality of conductive terminals having a third and a fourth conductive terminal sharing a longitudinal axis.

20. The artificial tree of claim 17 further comprising a single power cord configured to connect to an external power source and receive an input power, the single power cord in electrical connection with the electrical circuitry.

21. The artificial tree of claim 20 further comprising a fourth DC connector interface electrically connected to the single power cord and configured to output a DC output power, wherein the first light string is electrically connected to the fourth DC connector interface so as to receive the DC output power when the single power cord is connected to the external power source.

22. An artificial tree, comprising:
a first tree section comprising:
a first trunk portion,
a first plurality of branches joined to the first trunk portion,
a first electrical connector having a first plurality of conductive terminals, the first plurality of conductive terminals including a first conductive terminal sharing a longitudinal axis with a second conductive terminal,
a first light string having a first plurality of light-emitting diodes (LEDs), the first light string disposed on the first plurality of branches, and
a first wiring system electrically connected to the first electrical connector and the first light string;
a second tree section comprising:
a second trunk portion,
a second plurality of branches joined to the second trunk portion,
a second electrical connector having a second plurality of conductive terminals, the second electrical connector configured to couple to the first electrical connector
a second light string having a second plurality of LEDs, the second light string disposed on the second plurality of branches, and
a second wiring system; and
electronic circuitry in electrical connection with the first wiring system and the first electrical connector, the electronic circuitry configured to transmit power and control data to the first plurality of LEDs and the second plurality of LEDs via the first wiring system and configured to transmit power and the control data to the first electrical connector;
wherein the first tree section is configured to couple to the second tree section such that the first electrical connector of the first tree section is in electrical connection with the second electrical connector of the second tree section, thereby mechanically and electrically connecting the first tree section to the second tree section such that the power and the control data are transmitted to the second tree section
wherein the first electrical connector and the second electrical connector are configured to transmit an alternating-current (AC) power and a DC power.

23. The artificial tree of claim 22, wherein the second plurality of conductive terminals of the second electrical connector comprises a third conductive terminal sharing a longitudinal axis with a fourth conductive terminal.

24. The artificial tree of claim 22, wherein the first plurality of LEDs includes LEDs of a first color and LEDs of a second color, and the control data determines whether the LEDs of the first color will be powered or the LEDs of the second color will be powered.

25. The artificial tree of claim 22, wherein the first wiring system includes a communication line connected to the electronic circuitry and is configured to transmit the control data to the first light string.

26. The artificial tree of claim 22, wherein the electronic circuitry includes a processor and is configured to cause the first plurality of LEDs to control a color of the first plurality of LEDs, and the first plurality of LEDs is capable of emitting light having a first color or a second color.

27. The artificial tree of claim 22, wherein the first plurality of LEDs includes a first group of LEDs and a second group of LEDs, and the electronic circuitry is configured to selectively power the first group of LEDs and the second group of LEDs such that one of the first group of LEDs and the second group of LEDs is powered off and the other of the first group of LEDs and the second group of LEDs is powered on.

28. The artificial tree of claim 22, wherein the first electrical connector includes four or more conductive terminals.

29. The artificial tree of claim 22 further comprising:
a third tree section comprising:
a third trunk portion,
a third electrical connector having a third plurality of conductive terminals,
a third wiring system, and
a third light string.

30. The artificial tree of claim 29, wherein the first plurality of conductive terminals comprises two conductive terminals, the second plurality of conductive terminals comprises two conductive terminals, and the third plurality of conductive terminals comprises four conductive terminals.

31. An artificial tree, comprising:
a first tree section comprising:
a first trunk portion,
a first plurality of branches joined to the first trunk portion,
a first electrical connector having a first plurality of conductive terminals, the first plurality of conductive terminals including a first conductive terminal sharing a longitudinal axis with a second conductive terminal,
a first light string having a first plurality of light-emitting diodes (LEDs), the first light string disposed on the first plurality of branches, and a first wiring system electrically connected to the first electrical connector and the first light string;
a second tree section comprising:
a second trunk portion,
a second plurality of branches joined to the second trunk portion,
a second electrical connector having a second plurality of conductive terminals, the second electrical connector configured to couple to the first electrical connector
a second light string having a second plurality of LEDs, the second light string disposed on the second plurality of branches, and
a second wiring system;
a third tree section comprising:
a third trunk portion,
a third electrical connector having a third plurality of conductive terminals,
a third wiring system, and
a third light string; and
electronic circuitry in electrical connection with the first wiring system and the first electrical connector, the electronic circuitry configured to transmit power and control data to the first plurality of LEDs and the second plurality of LEDs via the first wiring system and configured to transmit power and the control data to the first electrical connector;
wherein the first tree section is configured to couple to the second tree section such that the first electrical connector of the first tree section is in electrical connection with the second electrical connector of the second tree section, thereby mechanically and electrically connecting the first tree section to the second tree section such that the power and the control data are transmitted to the second tree section, and
wherein the first plurality of conductive terminals comprises two conductive terminals, the second plurality of conductive terminals comprises two conductive terminals, and the third plurality of conductive terminals comprises four conductive terminals.

\* \* \* \* \*